(12) United States Patent
Suzuki et al.

(10) Patent No.: US 10,024,295 B2
(45) Date of Patent: Jul. 17, 2018

(54) IGNITION TIMING CONTROL DEVICE AND IGNITION TIMING CONTROL SYSTEM

(71) Applicant: NGK SPARK PLUG CO., LTD., Nagoya-shi, Aichi (JP)

(72) Inventors: Isao Suzuki, Ichinomiya (JP); Koji Yamamoto, Konan (JP)

(73) Assignee: NGK SPARK PLUG CO., LTD., Nagoya-shi, Aichi (JP)

( * ) Notice: Subject to any disclaimer, the term of this patent is extended or adjusted under 35 U.S.C. 154(b) by 139 days.

(21) Appl. No.: 14/916,222

(22) PCT Filed: Aug. 4, 2014

(86) PCT No.: PCT/JP2014/004054
§ 371 (c)(1),
(2) Date: Mar. 3, 2016

(87) PCT Pub. No.: WO2015/056378
PCT Pub. Date: Apr. 23, 2015

(65) Prior Publication Data
US 2016/0195055 A1 Jul. 7, 2016

(30) Foreign Application Priority Data

Oct. 15, 2013 (JP) ................. 2013-214962

(51) Int. Cl.
*F02P 5/00* (2006.01)
*F02P 11/02* (2006.01)
(Continued)

(52) U.S. Cl.
CPC ............ *F02P 11/02* (2013.01); *F02D 31/001* (2013.01); *F02D 35/027* (2013.01);
(Continued)

(58) Field of Classification Search
CPC ......... Y02T 10/46; F02P 5/152; F02P 5/1522; F02P 5/1502; F02P 5/1521; F02P 5/045;
(Continued)

(56) References Cited

U.S. PATENT DOCUMENTS 4,236,491 A * 12/1980 Hattori .................. F02P 5/152
123/406.37
4,377,999 A * 3/1983 Komurasaki ......... F02P 5/1521
123/406.34

(Continued)

FOREIGN PATENT DOCUMENTS

DE 4221815 A1 * 2/1993 ........... F02D 41/266
JP 58-11824 A 1/1983
(Continued)

OTHER PUBLICATIONS

International Search Report of PCT/JP2014/004054, dated Nov. 4, 2014. [PCT/ISA/210].

*Primary Examiner* — Marguerite McMahon
*Assistant Examiner* — Tea Holbrook
(74) *Attorney, Agent, or Firm* — Sughrue Mion, PLLC

(57) ABSTRACT

An ignition timing control device has a knocking detection unit and an ignition timing adjustment unit. In a condition that the operation state of the internal combustion engine is suitable for adjustment of the ignition timing, the ignition timing control device outputs to an igniter an adjusted ignition signal as adjusted (corrected) by an adjusted ignition timing determination process. The ignition timing control device outputs to the igniter a reference ignition signal as it is outputted from an internal combustion engine control unit without adjustment (correction) in a condition that the operation state of the internal combustion engine is not suitable for adjustment of the ignition timing.

6 Claims, 15 Drawing Sheets

(51) Int. Cl.

| | | |
|---|---|---|
| *F02D 41/14* | (2006.01) | |
| *F02P 3/04* | (2006.01) | |
| *F02P 5/152* | (2006.01) | |
| *F02D 35/02* | (2006.01) | |
| *G01L 23/22* | (2006.01) | |
| *G01L 1/24* | (2006.01) | |
| *F02D 31/00* | (2006.01) | |
| *F02P 5/145* | (2006.01) | |
| *F02P 17/00* | (2006.01) | |
| *F02P 7/067* | (2006.01) | |
| *F02P 11/06* | (2006.01) | |

(52) U.S. Cl.
CPC ........ *F02D 41/1497* (2013.01); *F02P 3/0442* (2013.01); *F02P 5/145* (2013.01); *F02P 5/152* (2013.01); *G01L 1/246* (2013.01); *G01L 23/222* (2013.01); *F02D 2200/101* (2013.01); *F02D 2200/1012* (2013.01); *F02D 2400/11* (2013.01); *F02P 5/1523* (2013.01); *F02P 7/067* (2013.01); *F02P 11/06* (2013.01); *F02P 17/00* (2013.01); *Y02T 10/46* (2013.01)

(58) Field of Classification Search
CPC ..... F02P 5/1504; F02P 5/1506; F02D 35/027; F02D 41/0097; F02D 2200/101; F02D 41/061
USPC ......... 123/406.16, 350, 305, 406.11, 406.12, 123/406.21, 406.24, 406.58, 406.59
See application file for complete search history.

(56) References Cited

U.S. PATENT DOCUMENTS

| | | | |
|---|---|---|---|
| 4,382,429 A | 5/1983 | Enoshima et al. | |
| 4,638,228 A * | 1/1987 | Junginger | B60K 31/047 318/569 |
| 4,715,342 A * | 12/1987 | Nagai | F02P 5/1521 123/406.32 |
| 4,793,310 A * | 12/1988 | Komurasaki | F02P 5/152 123/406.34 |
| 4,887,574 A * | 12/1989 | Kuroiwa | F02D 35/022 123/406.27 |
| 4,971,007 A * | 11/1990 | Gopp | F02P 5/1455 123/406.23 |
| 4,991,553 A * | 2/1991 | Kurihara | F02P 5/1523 123/406.37 |
| 5,035,219 A * | 7/1991 | Ohkumo | F02P 5/1506 123/406.33 |
| 5,038,736 A * | 8/1991 | Ohkumo | F02P 5/1455 123/406.33 |
| 5,157,965 A * | 10/1992 | Koegeler | F02B 75/16 73/114.15 |
| 5,158,057 A * | 10/1992 | Ikeura | F02P 5/152 123/406.36 |
| 5,184,590 A * | 2/1993 | Hashimoto | F02P 5/1502 123/406.58 |
| 5,267,164 A * | 11/1993 | Miyama | F02P 5/152 123/406.33 |
| 5,287,281 A | 2/1994 | Meaney | |
| 5,421,304 A * | 6/1995 | Gibtner | F02P 5/1521 123/406.39 |
| 5,422,811 A * | 6/1995 | Togai | F02P 3/0456 123/406.29 |
| 5,447,061 A * | 9/1995 | Fujiki | G01M 15/11 701/110 |
| 5,448,975 A * | 9/1995 | Sato | F02P 5/045 123/406.44 |
| 5,542,389 A * | 8/1996 | Miyamoto | F02D 37/02 123/339.1 |
| 5,867,115 A * | 2/1999 | Honda | H03M 1/1019 341/118 |
| 5,929,322 A * | 7/1999 | Aoki | G01L 23/225 73/35.08 |
| 5,992,380 A | 11/1999 | Inagaki | |
| 6,006,156 A * | 12/1999 | Tozzi | F02D 35/021 123/406.14 |
| 6,138,638 A * | 10/2000 | Morikawa | F02D 41/061 123/295 |
| 6,223,723 B1 | 5/2001 | Ito | |
| 6,408,242 B1 * | 6/2002 | Tozzi | F02D 35/021 324/399 |
| 6,493,831 B1 * | 12/2002 | Saitoh | G06F 1/14 713/502 |
| 6,520,149 B2 * | 2/2003 | Kokubo | G01L 23/225 123/406.12 |
| 6,845,312 B1 * | 1/2005 | Cross | F02D 35/027 123/406.2 |
| 2002/0038647 A1 * | 4/2002 | Tashiro | B60W 10/06 123/350 |
| 2005/0056240 A1 * | 3/2005 | Sugiyama | F02B 75/045 123/78 E |
| 2007/0277780 A1 * | 12/2007 | Akazaki | F02D 35/028 123/406.22 |
| 2010/0168989 A1 * | 7/2010 | Gao | F02D 41/2422 701/110 |
| 2011/0108002 A1 * | 5/2011 | Leufen | F02P 9/002 123/406.58 |
| 2011/0132327 A1 * | 6/2011 | Aso | F01L 1/185 123/436 |
| 2012/0192833 A1 * | 8/2012 | Hagari | F02D 35/027 123/406.35 |
| 2013/0160739 A1 * | 6/2013 | Suzuki | F02P 5/1502 123/406.29 |
| 2014/0338636 A1 * | 11/2014 | Irie | F02D 41/0062 123/436 |
| 2015/0027409 A1 | 1/2015 | Inagaki | |

FOREIGN PATENT DOCUMENTS

| | | |
|---|---|---|
| JP | 7-305649 A | 11/1995 |
| JP | 10-259777 A | 9/1998 |
| JP | 2006-118482 A | 5/2006 |
| JP | 2008-215141 A | 9/2008 |
| JP | 5432398 B1 | 3/2014 |
| WO | WO 2010092876 A1 * | 8/2010 ........... F02D 35/027 |

* cited by examiner

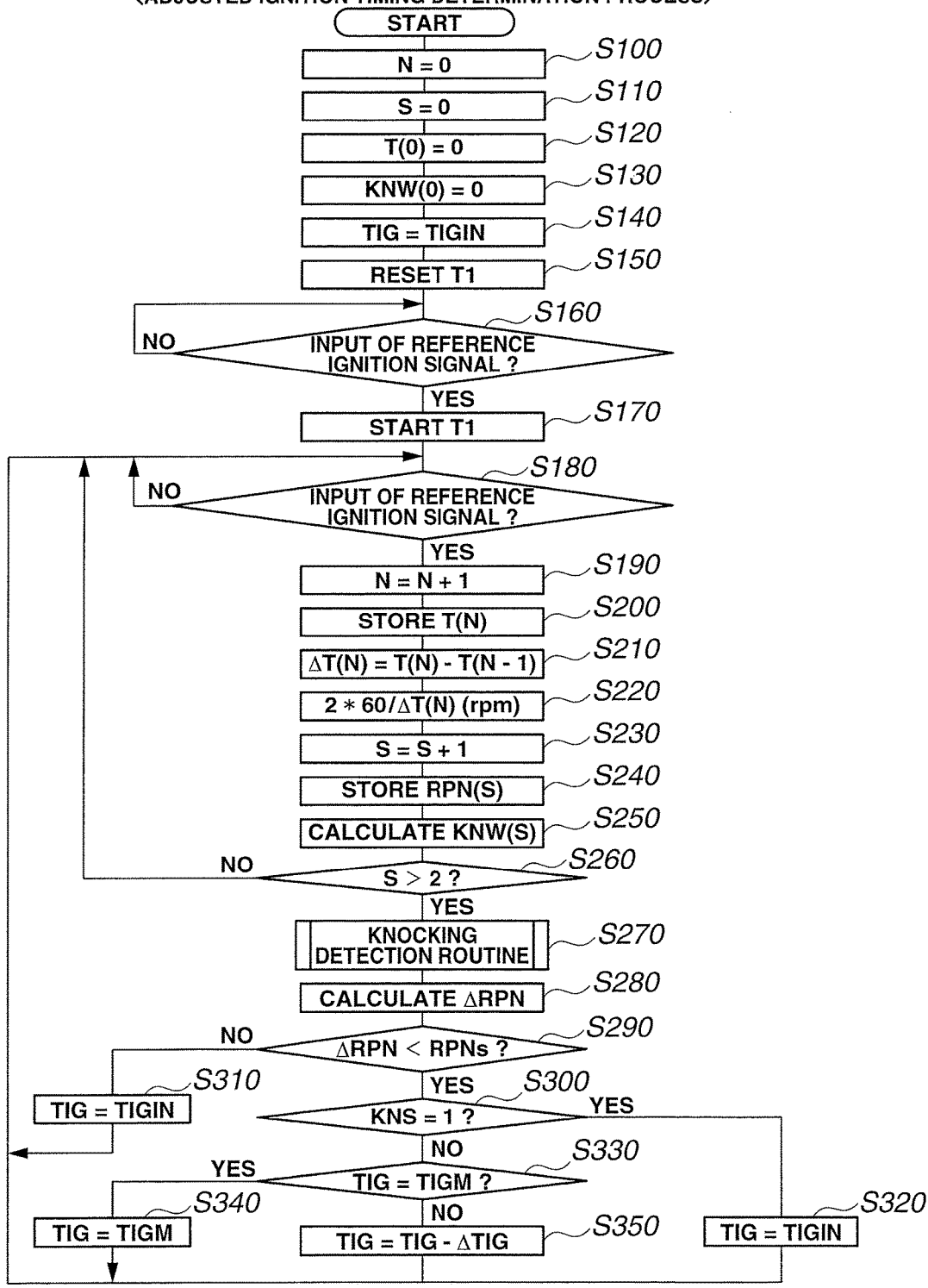

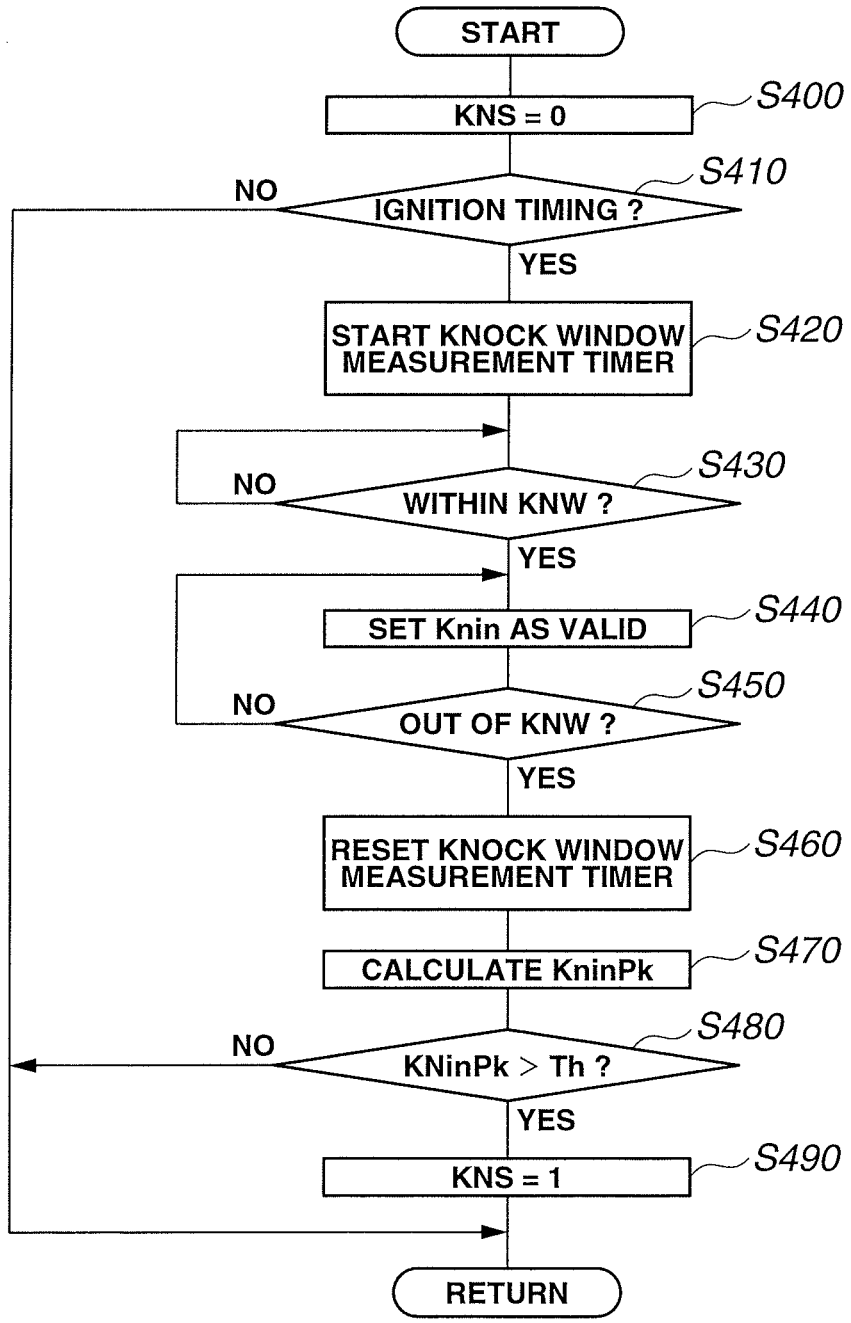

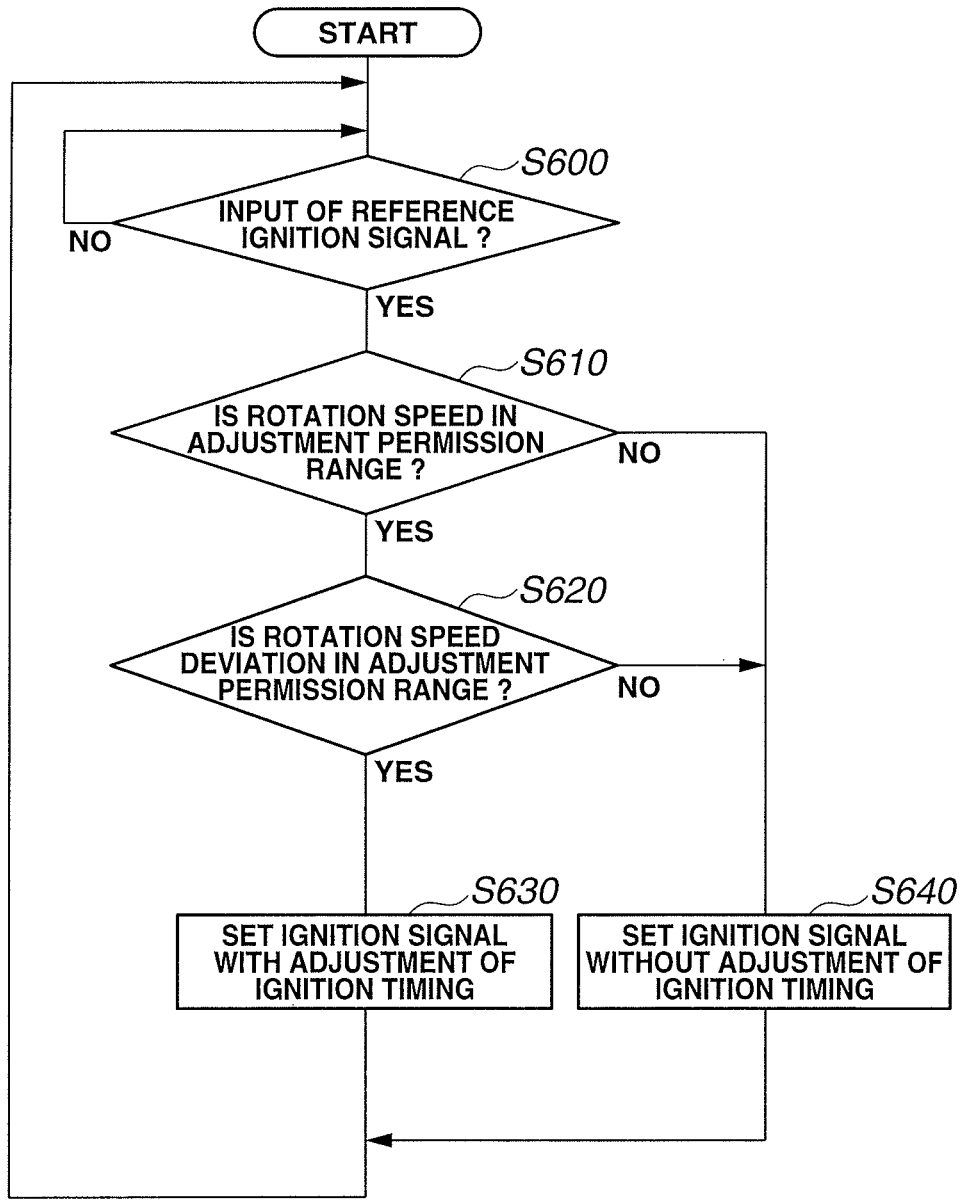

(a)

IGNITION TIMING CONTROL DEVICE AND IGNITION TIMING CONTROL SYSTEM

CROSS REFERENCE TO RELATED APPLICATIONS

This application is a National Stage of International Application No. PCT/JP2014/004054 filed Aug. 4, 2014, claiming priority based on Japanese Patent Application No. 2013-214962, filed Oct. 15, 2013, the contents of all of which are incorporated herein by reference in their entirety.

FIELD OF THE INVENTION

The present invention relates to an ignition timing control device and ignition timing control system used for an internal combustion engine (sometimes simply referred to as "engine"), such as a general purpose engine for a small craft, a small generator, a lawn mower etc., an engine for a motorcycle or an engine for a construction machine, so as to control an ignition timing of the engine according to a knocking state of the engine.

BACKGROUND ART

Conventionally, ignition timing control is known as a technique for suppressing engine knocking and properly controlling engine operations by mounting a knocking sensor on an engine and controlling an ignition timing of the engine based on an output signal of the knocking sensor (see Patent Document 1).

In the ignition timing control, the ignition timing is advanced stepwisely when the occurrence of engine knocking is not detected by the knocking sensor; and the ignition timing is retarded when the occurrence of engine knocking is detected by the knocking sensor. This ignition timing control allows maximum use of engine output power while preventing engine knocking.

It is common in four-wheel vehicles to perform ignition timing control based on the output signal of the knocking sensor. On the other hand, simple-structure engines such as general purpose engines for small generators etc. and engines are equipped with electronic control units for control of engine operations such as engine rotation speed but are not generally equipped with knocking sensors. The ignition timing control is thus not currently preformed on the simple-structure engines for suppression of engine knocking.

PRIOR ART DOCUMENTS

Patent Documents

Patent Document 1: Japanese Laid-Open Patent Publication No. 2008-215141

SUMMARY OF THE INVENTION

Problems to be Solved by the Invention

In recent years, there has been a demand to perform ignition timing control on the simple-structure engines such as general purpose engines and motorcycle engines for optimization of fuel efficiency and output performance.

In response to the above demand, it is conceivable to perform ignition timing control by mounting knocking sensors on these simple-structure engines as discussed above. In such a case, however, the following problem arises.

In the case of performing ignition timing control by mounting the knocking sensor on the general purpose engine or motorcycle engine, design reconsideration of the electronic engine control unit is required for execution of the ignition timing control. This results in enormous effort (work load) and cost.

The present invention has been made to solve the above problem. It is an object of the present invention to provide an ignition timing control device and ignition timing control system for an internal combustion engine, each of which is capable of easily performing ignition timing control on the internal combustion engine so as to suppress the occurrence of engine knocking even in the case where the internal combustion engine is not equipped with ignition timing control and knocking suppression functions.

Means for Solving the Problems (1) In accordance with one aspect of the present invention, there is provided an ignition timing control device for an internal combustion engine, comprising: a knocking detection unit that detects a knocking state of the internal combustion engine; and an ignition timing adjustment unit that adjusts an ignition timing of the internal combustion engine based on a knocking signal outputted from the knocking detection unit, which indicates the knocking state of the internal combustion engine and an ignition timing signal outputted from an external electronic control unit, which relates to the ignition timing of the internal combustion engine, wherein the ignition timing control device has a rotation speed-related information determination portion and a signal switching portion.

The rotation speed-related information determination portion determines rotation speed-related information based on the ignition timing signal. Herein, the rotation speed-related information includes at least one of a rotation speed of the internal combustion engine and a rotation speed variation amount of the internal combustion engine.

The signal switching portion judges whether the rotation speed-related information determined by the rotation speed-related information determination portion falls within a predetermined adjustment permission range. When the rotation speed-related information falls within the adjustment permission range, the signal switching portion outputs an adjusted ignition signal relating to the ignition timing adjusted by the ignition timing adjustment unit. When the rotation speed-related information falls outside the adjustment permission range, the signal switching portion outputs the ignition timing signal without adjustment of the ignition timing by the ignition timing adjustment unit.

The adjustment permission range is set to the range of the rotation speed-related information where the operation state of the internal combustion engine is suitable for adjustment of the ignition timing.

As mentioned above, the ignition timing control device of the present invention is provided with the knocking detection unit and the ignition timing adjustment unit; and both of the knocking signal and the ignition timing signal are inputted into the ignition timing adjustment unit.

Thus, the ignition timing adjustment unit is able to made proper adjustment (correction such as advance control or retard control) of the ignition timing on the basis of the knocking signal from the knocking detection unit and the ignition timing signal from the external electronic control unit.

This ignition timing control device is applicable to engines (such as conventional general purpose engines and motorcycle engines) on which knocking control has not been performed.

It is therefore possible, by applying the ignition timing control device of the present invention to a conventional electronic engine control unit, to obtain remarkable effects such as elimination of the need to reconsider the design of electronic engine control unit for ignition timing control and significant reduction of the effort (work load) and cost for such design reconsideration.

Further, the ignition timing control device is provided with the rotation speed-related information determination portion and the signal switching portion so as to switch whether to output the adjusted ignition signal or output the ignition timing signal as it is obtained from the external electronic control unit without adjustment of the ignition timing by the ignition timing adjustment unit depending on whether or not the rotation speed-related information falls within the adjustment permission range.

More specifically, the signal switching portion outputs the adjusted ignition signal relating to the ignition timing adjusted by the ignition timing adjustment unit when the rotation speed-related information falls within the adjustment permission range. When the rotation speed-related information does not fall within the adjustment permission range, the signal switching portion outputs the ignition timing signal without adjustment of the ignition timing by the ignition timing adjustment unit.

The adjustment permission range is set to the range of the rotation speed-related information where the operation state of the internal combustion engine is suitable for adjustment of the ignition timing as mentioned above.

It is judged that the operation state of the internal combustion engine is suitable for adjustment of the ignition timing when the rotation speed-related information falls within the adjustment permission range. It is judged that the operation state of the internal combustion engine is not suitable for adjustment of the ignition timing when the rotation speed-related information falls outside the adjustment permission range.

When the rotation speed-related information falls outside the adjustment permission range, the operation state of the internal combustion engine is not suitable for adjustment of the ignition timing. In this case, the ignition timing control device may fail to perform proper adjustment of the ignition timing and thereby output the adjusted ignition signal relating to the improperly adjusted ignition timing. Such improper ignition timing control leads to adverse influence on the operation state of the internal combustion engine.

The ignition timing control device of the present invention is however provided with the rotation speed-related information determination portion and the signal switching portion. Thus, the ignition timing control device outputs the ignition timing signal without adjustment of the ignition timing by the ignition timing adjustment unit, rather than the adjusted ignition signal, when the rotation speed-related information falls outside the adjustment permission range.

Namely, it is possible to avoid adverse influence on the operation state of the internal combustion engine by outputting the ignition timing signal from the ignition timing control device without adjustment of the ignition timing when the rotation speed-related information does not fall within the adjustment permission range.

On the other hand, it is possible to suppress the occurrence of engine knocking by outputting the adjusted ignition signal from the ignition timing control device when the rotation speed-related information falls within the adjustment permission range.

It is accordingly possible for the ignition timing control device of the present invention to, even in the case where the internal combustion engine is not equipped with ignition timing control and knocking suppression functions, easily perform ignition timing control on the internal combustion engine and suppress the occurrence of engine knocking.

Herein, the external electronic control unit refers to an electronic control device provided separately from the ignition timing control device of the present invention. One example of the external electronic control unit is an electronic control unit (engine control unit: ECU) for comprehensive operation control of the internal combustion engine. Further, the ignition timing signal refers to a signal including information about the ignition timing. One example of the ignition timing signal is a reference ignition signal indicating a reference ignition timing as a reference of the ignition timing.

The range in which the operation state of the internal combustion is suitable for adjustment of the ignition timing corresponds to, for example, an operation range where the fuel efficiency of the internal combustion engine is improved by adjustment (correction) of the ignition timing based on knocking detection. The range in which the operation state of the internal combustion is not suitable for adjustment of the ignition timing corresponds to, for example, an operation range where the fuel efficiency of the internal combustion is deteriorated by adjustment (correction) of the ignition timing based on knocking detection or an operation state where the internal combustion engine may be damaged due to adjustment (correction) of the ignition timing by the ignition timing adjustment unit.

(2) In accordance with another aspect of the present invention, there is provided an ignition timing control device for an internal combustion engine as described above, wherein the rotation speed-related information determination portion determines at least the rotation speed of the internal combustion engine as the rotation speed-related information;

wherein, when the rotation speed determined by the rotation speed-related information determination portion falls outside an adjustment permission range, the signal switching portion judges that the rotation speed-related information falls outside the adjustment permission range and outputs the ignition timing signal without amendment of the ignition timing by the ignition timing adjustment unit; and wherein, when all of the rotation speed-related information including the rotation speed falls within the adjustment permission range, the signal switching portion judges that the rotation speed-related information falls within the adjustment permission range and outputs the adjusted ignition signal relating to the ignition timing adjusted by the ignition timing adjustment unit.

By the above-configured rotation speed-related information determination portion and the above-configured signal switching portion, the judgment of whether or not the operation state of the internal combustion engine is suitable for adjustment of the ignition timing is made based on at least the rotation speed of the internal combustion engine.

When the rotation speed determined by the rotation speed-related information determination portion does not fall within the adjustment permission range, the signal switching portion judges that the rotation speed-related information falls outside the adjustment permission range irrespective of the other rotation speed-related information. Then, the signal switching portion outputs the ignition timing signal without amendment of the ignition timing by the ignition timing adjustment unit, rather than the adjusted ignition signal.

It is thus possible to avoid adverse influence on the operation state of the internal combustion engine by outputting the ignition timing signal from the ignition timing control device without adjustment of the ignition timing by the ignition timing adjustment unit when at least the rotation speed does not fall within the adjustment permission range.

(3) In accordance with another aspect of the present invention, there is provided an ignition timing control device for an internal combustion engine as described above, wherein the rotation speed-related information determination portion determines at least the rotation speed variation amount of the internal combustion engine as the rotation speed-related information;

wherein, when the rotation speed variation amount determined by the rotation speed-related information determination portion falls outside an adjustment permission range, the signal switching portion judges that the rotation speed-related information falls outside the adjustment permission range and outputs the ignition signal without amendment of the ignition timing by the ignition timing adjustment unit; and wherein, when all of the rotation speed-related information including the rotation speed variation amount falls within the adjustment permission range, the signal switching portion judges that the rotation speed-related information falls within the adjustment permission range and outputs the adjusted ignition signal relating to the ignition timing adjusted by the ignition timing adjustment unit.

By the above-configured rotation speed-related information determination portion and the above-configured signal switching portion, the judgment of whether or not the operation state of the internal combustion engine is suitable for adjustment of the ignition timing is made based on at least the rotation speed deviation amount of the internal combustion engine.

When the rotation speed deviation amount determined by the rotation speed-related information determination portion does not fall within the adjustment permission range, the signal switching portion judges that the rotation speed-related information falls outside the adjustment permission range irrespective of the other rotation speed-related information. Then, the signal switching portion outputs the ignition timing signal without amendment of the ignition timing by the ignition timing adjustment unit, rather than the adjusted ignition signal.

It is thus possible to avoid adverse influence on the operation state of the internal combustion engine by outputting the ignition timing signal from the ignition timing control device without adjustment of the ignition timing by the ignition timing adjustment unit when at least the rotation speed deviation amount does not fall within the adjustment permission range.

Even in the case where noise is superimposed on the ignition timing signal, it is possible to avoid adverse influence on the operation state of the internal combustion engine by making the judgment based on the rotation speed variation amount and outputting the ignition timing signal from the ignition timing control device without adjustment of the ignition timing.

More specifically, the signal switching portion judges that the rotation speed-related information does not fall within the adjustment permission range and outputs the ignition timing signal without adjustment of the ignition timing in the case where there arises a sudden change in the rotation speed variation amount determined by the rotation speed-related information determination portion due to superimposition of noise on the ignition timing signal.

It is thus possible to, even in the case where noise is superimposed on the ignition timing signal, prevent the ignition timing control device from misjudging the noise as the ignition signal and executing adjustment of the ignition timing based on such misjudgment and thereby avoid adverse influence on the operation state of the internal combustion engine.

(4) In accordance with another aspect of the present invention, there is provided an ignition timing control device for an internal combustion engine as described above, wherein the rotation speed-related information determination portion determines the rotation speed of the internal combustion engine based on a time interval of receipt of the ignition timing signal.

As the time interval of the ignition timing of the internal combustion engine changes depending on the rotation speed of the internal combustion engine, the time interval of receipt of the ignition timing signal changes depending on the rotation speed of the internal combustion engine. It is thus possible to determine the rotation speed of the internal combustion engine based on the time interval of receipt of the ignition timing signal. The time interval of the ignition timing herein refers to, for example, a time interval between falling edges of the successive ignition signals.

(5) In accordance with another aspect of the present invention, there is provided an ignition timing control device for an internal combustion engine as described above, wherein the ignition timing signal is a reference ignition signal indicating a reference ignition timing as a reference of the ignition timing.

The reference ignition timing (e.g. the after-mentioned ignition timing (A)) is suitably usable as the ignition timing signal.

(6) In accordance with another aspect of the present invention, there is provided an ignition timing control system for an internal combustion engine, comprising: an engine control unit that outputs an ignition signal relating to an ignition timing of the internal combustion engine; and an ignition timing control device that adjusts the ignition signal, wherein the ignition timing control device is configured as described above.

As mentioned above, the ignition timing control system of the present invention is provided with the above-mentioned ignition timing control device. It is accordingly possible by the ignition timing control system to, even in the case where the internal combustion engine is not equipped with ignition timing control and knocking suppression functions, easily perform ignition timing control on the internal combustion engine and suppress the occurrence of engine knocking as in the case of the ignition timing control device.

It is also possible for the ignition timing control system to, as in the case of the ignition timing control device, avoid adverse influence on the operation state of the internal combustion engine by outputting the ignition timing signal without adjustment of the ignition timing by the ignition timing adjustment unit in a condition that the operation state of the internal combustion engine is not suitable for adjustment of the ignition timing.

Effects of the Invention

As described above, it is possible by the adoption of the ignition timing control device or ignition timing control system of the present invention to easily perform ignition timing control on the internal combustion engine for suppression of engine knocking even in the case with the internal combustion engine is not equipped with ignition timing control and knocking suppression functions.

Furthermore, it is possible to avoid adverse influence on the operation state of the internal combustion engine by outputting the ignition timing signal, without adjustment of the ignition timing by the ignition timing adjustment unit, in a condition that the operation state of the internal combustion engine is not suitable for adjustment of the ignition timing.

BRIEF DESCRIPTION OF THE DRAWINGS

FIG. 7 is a flowchart for an adjusted ignition timing determination process executed by the ignition timing adjustment unit according to the first embodiment of the present invention.

FIG. 8 is a flowchart for a knocking detection process executed by the ignition timing adjustment unit according to the first embodiment of the present invention.

FIG. 9 is a flowchart for a signal switching process executed by the ignition timing adjustment unit according to the first embodiment of the present invention.

DESCRIPTION OF EMBODIMENTS

Hereinafter, exemplary embodiments (examples) of the present invention will be described in detail below. It should however be understood that the present invention is not limited to the following embodiments and can be embodied in various forms within the technical scope of the present invention.

1. First Embodiment

[1-1. Overall Configuration]

An ignition timing control device according to the first embodiment is designed for use in various engines (internal combustion engines), such as general purpose engines and motorcycle engines, so as to prevent the occurrence of knocking in an internal combustion engine by ignition timing control. In the following explanation, a four-cycle engine for a motorcycle is taken as an example of the internal combustion engine.

First, the overall system configuration of the internal combustion engine with the ignition timing control device of the first embodiment will be explained below.

Figure 1:
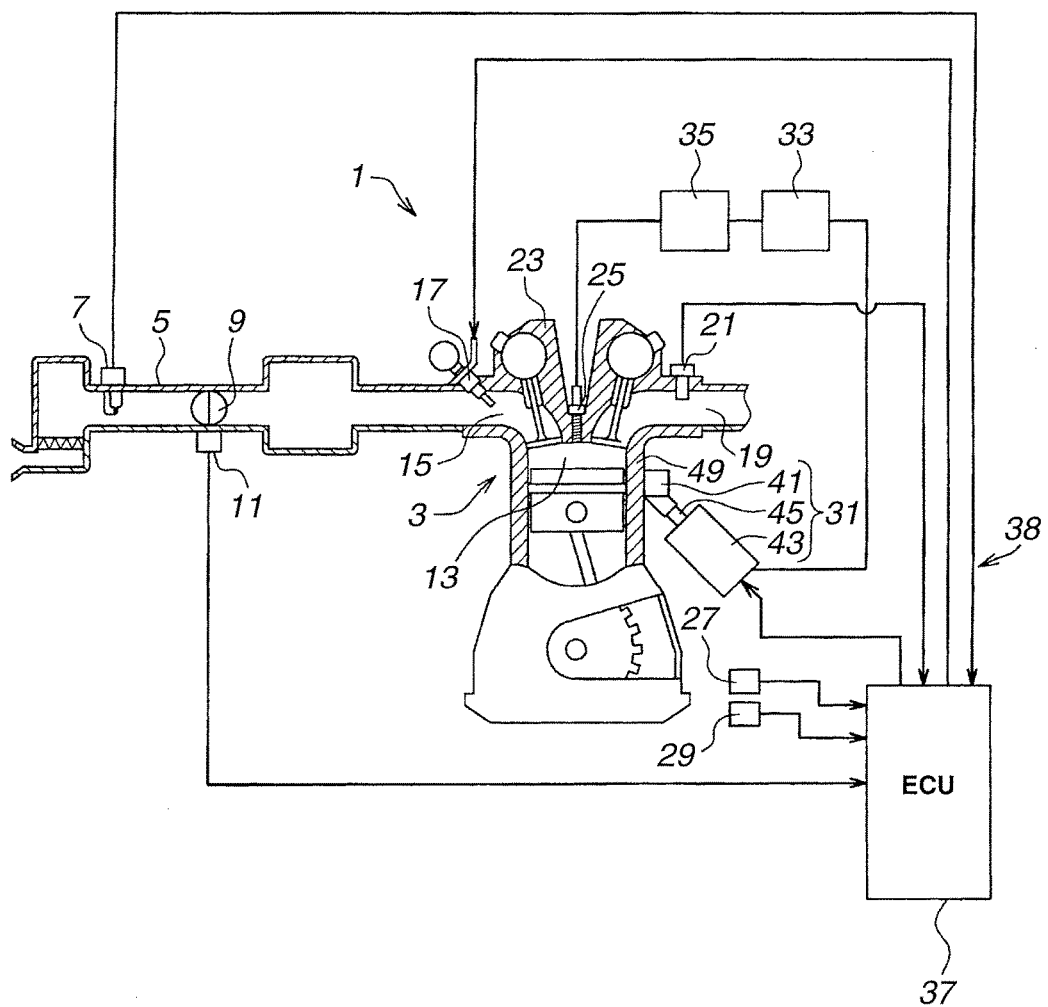
FIG. 1 is a system diagram of an internal combustion engine with an ignition timing control device according to a first embodiment of the present invention.

As shown in FIG. 1, the internal combustion engine (engine) 1 has an engine body 3, an intake pipe 5 for introducing air to the engine body 3, an air flow meter 7 for detecting an amount of the intake air, a throttle valve 9 for adjusting the amount of the intake air, a throttle opening sensor 11 for detecting an opening of the throttle valve 9, an intake manifold 15 for introducing the intake air into a combustion chamber 13, a fuel injection valve 17 for injecting fuel into the intake manifold 15, an exhaust manifold 19 for exhausting the air (combustion gas) from the engine body 3 and an air-fuel ratio sensor (or oxygen sensor) 21 for detecting an air-fuel ratio of the exhaust gas from the exhaust manifold 19.

A spark plug 25 is fixed to a cylinder head 23 of the engine body 3. There is mounted, on the engine body 3, an engine speed sensor 27 for detecting a speed (rotation speed) of the engine and a crank angle sensor 29 for detecting a crank angle of the engine.

The after-mentioned ignition timing control device 31 is mounted to the engine body 3. An ignitor 33 is coupled to the ignition timing control device 31. An ignition coil 35 is coupled to the ignitor 33. The ignition coil 35 is coupled to the spark plug 25.

An internal combustion engine control unit (sometimes simply referred to as "engine control unit") 37 is provided to perform comprehensively control the operation state of the engine body 3 (such as air-fuel ratio feedback control based on the engine rotation speed and the output of the air-fuel ratio sensor 21). Although not shown in the drawings, the internal combustion engine control unit 37 is in the form of a known electronic control unit (ECU) having a microcomputer equipped with a RAM, a ROM, a CPU etc.

In the first embodiment, the internal combustion engine control unit 37 serves to an external electronic control unit. Further, the combination of the ignition timing control device 31 and the internal combustion engine control unit 37 serves as an ignition timing control system 38.

The air flow meter 7, the throttle opening sensor 11, the air-fuel ratio sensor 21, the engine speed sensor 27, the crank angle sensor 29 and the ignition timing control device 31 are connected to input ports (not shown) of the internal combustion engine control unit 37 such that the internal combustion engine control unit 37 receives output signals (e.g. sensor signals) from these devices through the input ports.

On the other hand, the fuel injection valve 17 and the ignition timing control device 31 are connected to output ports (not shown) of the internal combustion engine control unit 37 such that the internal combustion engine control unit 37 outputs control signals to control the operations of these devices.

[1-2. Ignition Timing Control Device]

Next, the ignition timing control device 31 of the first embodiment will be explained below.

Figure 2A:
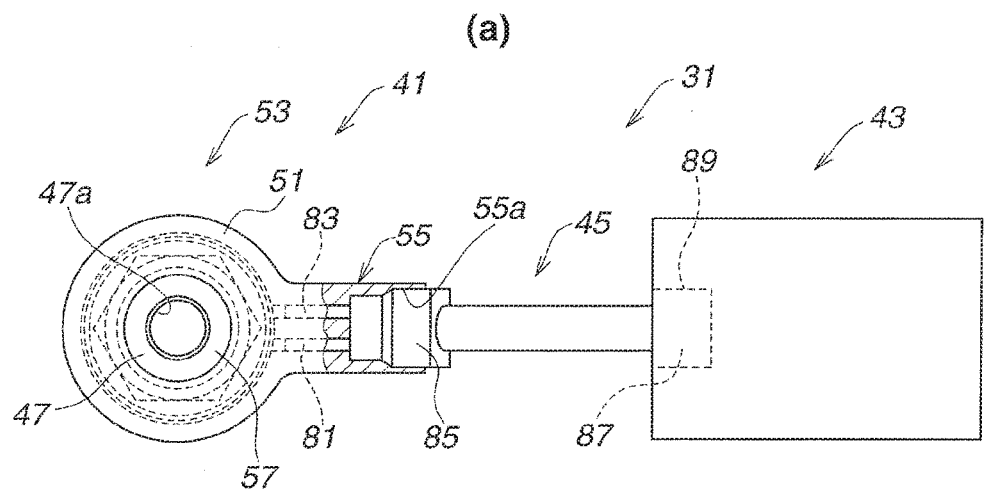
FIG. 2A is a plan view, partially in section, of the ignition timing control device according to the first embodiment of the present invention.
Figure 2B:
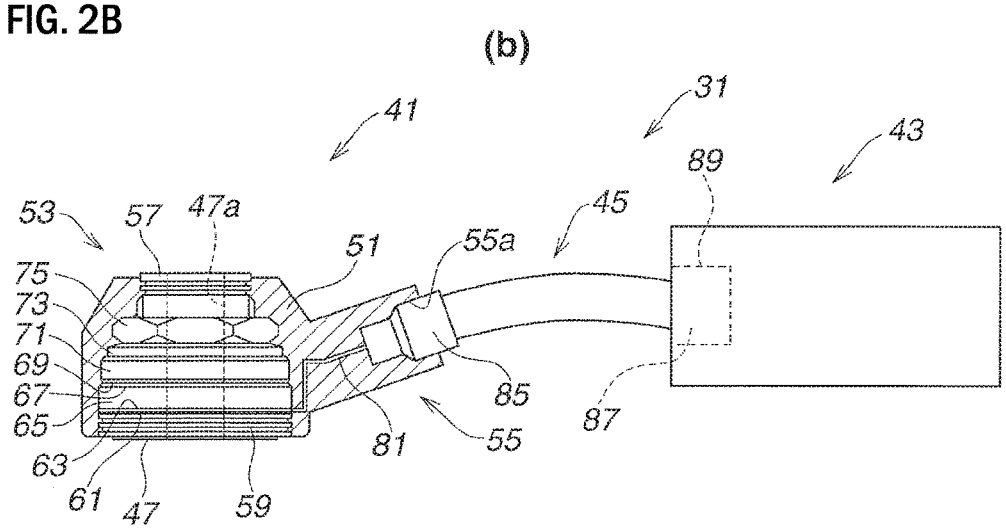
FIG. 2B is a front view, partially in section, of the ignition timing control device according to the first embodiment of the present invention.

In the first embodiment, the ignition timing control device 31 has a knocking detection unit 41 and an ignition timing adjustment unit 43 electrically and mechanically disconnectably coupled together through a connection cable 45 as shown in FIG. 2A and FIG. 2B.

The knocking detection unit 41 is in the form of a known non-resonant knocking sensor in which a piezoelectric element 65 is fitted on a metal shell 47 and is fixed to a cylinder block 49 of the engine body 3 by insertion of a fixing bolt (not shown) into an axial hole 47a of the metal shell 47 (also see FIG. 1).

More specifically, almost the whole of the knocking detection unit 41 is molded with a resin molded body 51. The knocking detection unit 41 includes a substantially cylindrical body part 53 and a substantially rectangular connector part 55 protruding from a lateral surface of the body part 53.

The metal shell 47 is provided in the body part 53 and has a circular cylindrical portion 57 and an annular collar portion 59 formed at one end (lower end in FIG. 2B) of the cylindrical portion 57. An annular first insulating plate 61, an annular first electrode plate 63, the annular piezoelectric element 65, an annular second electrode plate 67, an annular second insulating plate 69, an annular weight 71, an annular disc spring 73 and an annular nut 75 are arranged around the cylindrical portion 57 in this order from the side of the collar portion 59. First and second output terminals 81 and 83 are connected to the first and second electrode plates 63 and 67, respectively, so as to take out an output signal developed between the electrode plates 63 and 67.

The ignition timing adjustment unit 43 is configured to adjust the ignition timing of the engine and is in the form of a known electronic control unit having a microcomputer equipped with a RAM, a ROM, a CPU etc. as in the case of the internal combustion engine control unit 37

The connection cable 45 includes therein electric wires (not shown) respectively connected to the first and second output terminals 81 and 83. First and second connectors 85 and 87 are provided on both ends of the connection cable 45 and connected to the respective electric wires.

The first connector 85 is fitted in an opening 55a of the connector part 55 of the knocking detection unit 41 for connection of the electric wires to the first and second output terminals 81 and 83. The second connector 87 is fitted in a recessed connector part 89 of the ignition timing adjustment unit 43 for connection of the electric wires to internal wires (not shown) of the ignition timing adjustment unit 43.

In the first embodiment, the first connector 85 of the connection cable 45 is fitted in and disconnectably fixed by an adhesive to the connector part 55 of the knocking detection unit 41. Similarly, the second connector 87 of the connection cable 45 is fitted in and disconnectably fixed by an adhesive to the connector part 89 of the ignition timing adjustment unit 43.

[1-3. Electrical Configuration of Ignition Timing Control Device]

The electrical configuration of the ignition timing control device 31 will be explained below.

Figure 3A:
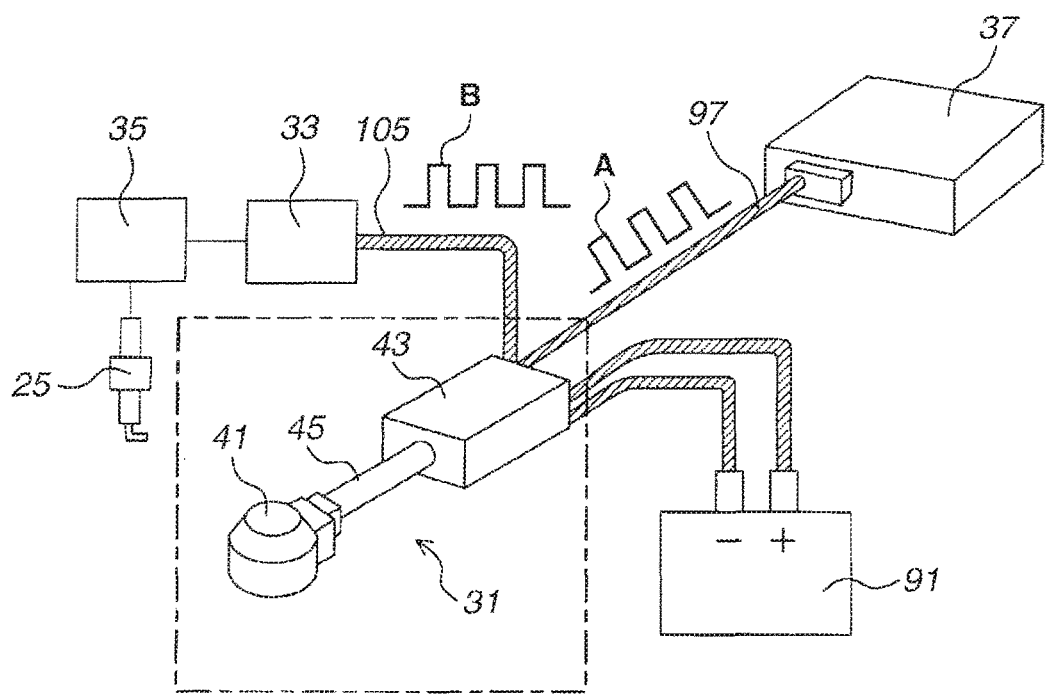
FIG. 3A is a schematic view showing the ignition timing control device and its peripheral devices according to the first embodiment of the present invention.
Figure 3B:
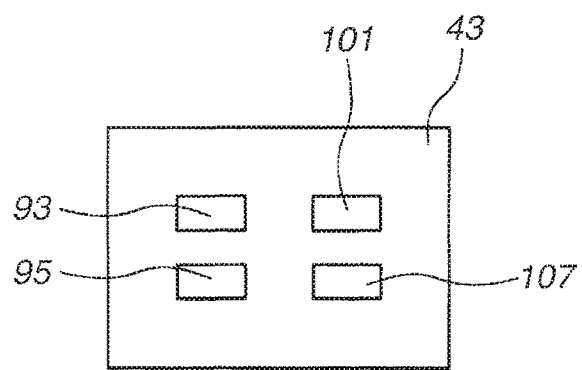
FIG. 3B is a schematic view showing connection terminals of an ignition timing adjustment unit of the ignition timing control device according to the first embodiment of the present invention.

As shown in FIG. 3A the ignition timing adjustment unit 43 of the ignition timing control device 31 is operated with the supply of power from a battery 91. The ignition timing adjustment unit 43 is thus provided with a pair of power terminals 93 and 95 so as to receive the supply of power from the battery 91 as shown in FIG. 3B.

The ignition timing adjustment unit 43 is detachably coupled to the internal combustion engine control unit 37 through a lead line (signal line) 97. The lead line 97 is herein detachable from both of the ignition timing adjustment unit 43 and the internal combustion engine control unit 37.

The ignition timing adjustment unit 43 has a signal receiving terminal 101 for receiving the after-mentioned ignition signal (A) from the internal combustion engine control unit 37. Further, the ignition timing adjustment unit 43 is coupled to the ignitor 33 through a single lead line 105 and has an ignition terminal 107 for outputting a signal to let the ignitor 33 actuate the ignition coil 35 (as the after-mentioned (adjusted) ignition signal (B)).

Figure 4:
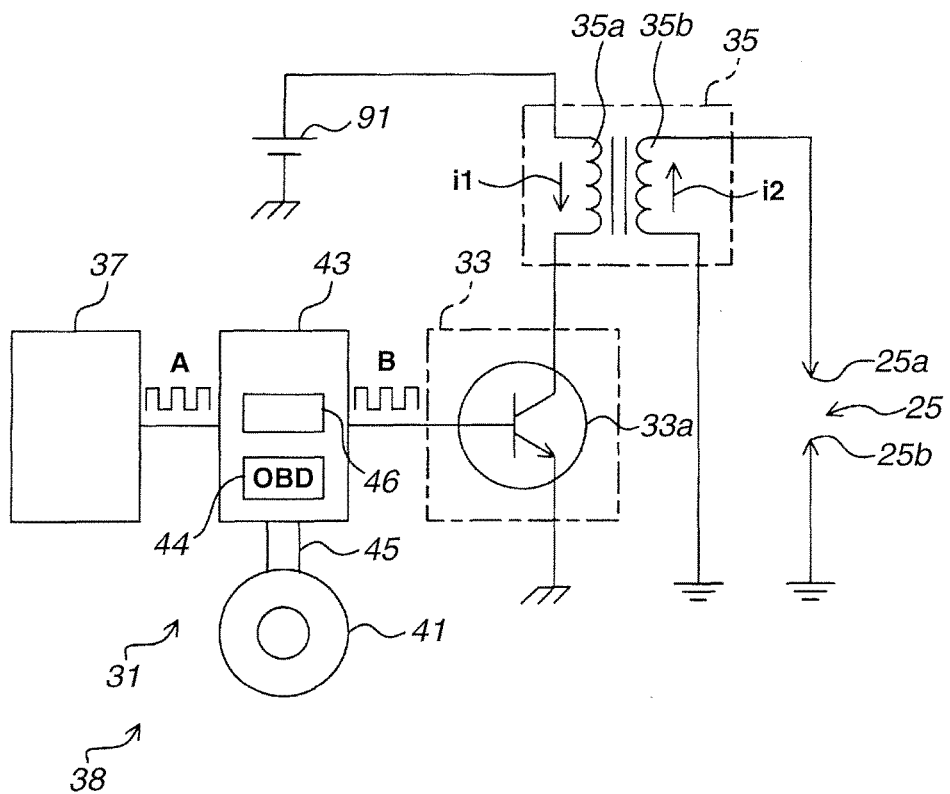
FIG. 4 is an electrical block diagram of the ignition timing control device and its peripheral devices according to the first embodiment of the present invention.

As shown in FIG. 4, the ignition coil 35 has primary and secondary windings 35a and 35b. One end of the primary winding 35a is connected to a positive terminal of the battery 91, whereas the other end of the primary winding 35a is connected to a collector of an n-p-n type power transistor 33a (of the ignitor 33). The power transistor 33a is a switching element for switching between energization and non-energization of the primary winding 35a. An emitter of the power transistor 33a is grounded to the same potential as a negative terminal of the battery 91. The igniter 33 is not limited to the type having the power transistor 33a. Alternatively, the other transistor such as IGBT or FET may be used in the igniter 33.

One end of the secondary winding 35b is grounded to the same potential as the negative terminal of the battery 91, whereas the other end of the secondary winding 35b is connected to a center electrode 25a of the spark plug 25. A ground electrode 25b of the spark plug 25 is also grounded to the same potential as the negative terminal of the battery 91.

In the first embodiment, the internal combustion engine control unit 37 and the ignition timing adjustment unit 43 are coupled to each other. When the ignition signal (B) is outputted from the ignition timing adjustment unit 43 to a base of the power transistor 33a, the power transistor 33a performs switching operation based on the ignition signal (B) so as to allow switching between energization and non-energization of the primary winding 35a of the ignition coil 35.

Furthermore, the ignition timing adjustment unit 43 is equipped with an OBD system 44 for abnormality diagnosis of the ignition timing adjustment unit 43. The OBD system 44 is configured to diagnose the occurrence or non-occurrence of an abnormality such as short-circuit and disconnection in the ignition timing adjustment unit 43. In the first embodiment, the OBD system 44 is also configured to diagnose the occurrence or non-occurrence of an abnormality in the knocking detection unit 41 and, more specifically, at least one abnormality such as short-circuit, disconnection, deterioration or loosening in the knocking detection unit 41.

It is feasible to perform abnormality diagnosis by the OBD system 44 according to any known method (such as method disclosed in e.g. Japanese Laid-Open Patent Publication No. S58-011824, Japanese Laid-Open Patent Publication No. H7-305649 or the like).

The ignition timing adjustment unit 43 is also equipped with an abnormality information storage memory 46 to store information about the abnormality detected by diagnosis operation of the OBD system 44. The abnormality information storage memory 46 is configured to store, as the abnormality information, the kind of the abnormality (short-circuit, disconnection, deterioration, loosening etc.), the location of occurrence of the abnormality (ignition timing adjustment unit 43 or knocking detection unit 41), the date of detection of the abnormality and the like.

The abnormality information storage memory 46 is in the form of a volatile storage media so as to store the abnormality information even after the stop of the ignition timing adjustment unit 43.

[1-4. Basic Operations for Ignition Timing Control]

The basic ignition timing control operations of the ignition timing control device 31 will be explained below.

The internal combustion engine control unit 37 determines a reference ignition timing as a reference of the ignition timing based on the engine rotation speed, the intake air amount and the like. The reference ignition timing corresponds to a basic ignition timing (to be adjusted by the ignition timing adjustment unit 43) as set by referring (checking) the current operation state of the internal combustion engine 1 to a map in which a plurality of ignition timings are set relative to the respective operation states of the internal combustion engine 1 with sufficient margins not to cause damage to the internal combustion engine 1 in view of engine variations, weather changes and the like.

Figure 5:
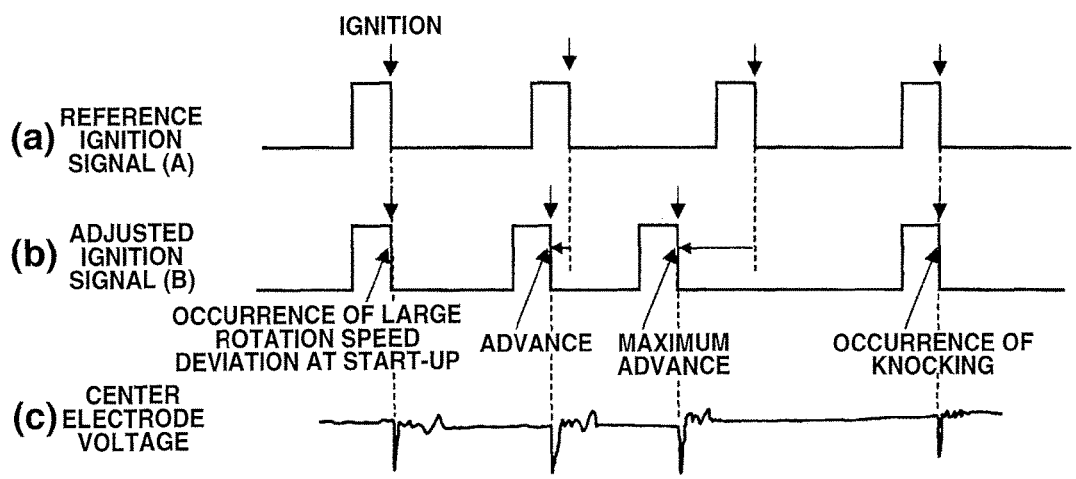
FIG. 5 is a schematic view showing the relationship of a reference ignition signal, an adjusted ignition signal and a center electrode voltage as set by the ignition timing control device according to the first embodiment of the present invention.

A signal indicative of the reference ignition timing is generated as the reference ignition signal (ignition signal A; see the upper part of FIG. 5). This reference ignition signal (A) is outputted to the ignition timing adjustment unit 43.

The ignition timing adjustment unit 43, while receiving the reference ignition signal (A), receives the signal (knocking signal) from the knocking detection unit 41 and judges the occurrence or non-occurrence of knocking (knock) in the engine based on the knocking signal. For example, the occurrence or non-occurrence of engine knocking can be judged based on the intensity of the peak of the knocking signal.

Then, the ignition timing adjustment unit 43 makes adjustment (correction) of the ignition timing according to the state of occurrence of engine knocking and determines an adjusted ignition timing. A signal indicative of the adjusted ignition timing is generated as the adjusted ignition signal (ignition signal B: see the middle part of FIG. 5).

Figure 6:
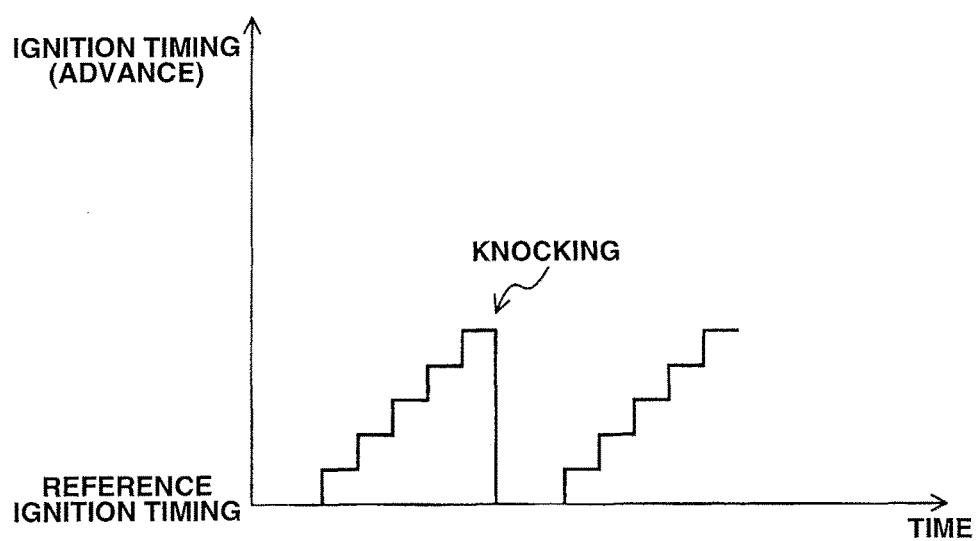
FIG. 6 is a graph showing the state of adjustment of ignition timing by timing retard control and timing advance control according to the first embodiment of the present invention.

As shown in FIG. 6, the adjusted ignition timing is set by gradually advancing the ignition timing to a maximum advance value in the non-occurrence of engine knocking and by returning the ignition timing to the reference ignition timing in the occurrence of engine knocking. The adjustment of the ignition timing is not made when there arises a large variation in the engine rotation speed as shown in FIG. 5 during a transient operation period e.g. starting or acceleration of the engine.

When the adjusted ignition timing is determined as mentioned above, the adjusted ignition signal (B) is outputted from the ignition timing adjustment unit 43 to the ignitor 33 as shown in FIG. 4. Upon input of the adjusted ignition signal (B) to the base of the power transistor 33*a*, the power transistor 33*a* performs switching operation according to the ON/OFF state of the adjusted ignition signal (B).

When the adjusted ignition signal (B) is in an OFF state (low level; in general, ground potential), there is no current flow through the base of the power transistor 33*a* so that the power transistor 33*a* is switched off (i.e. switched to a de-energization state) to interrupt the flow of an electric current (primary current i1) to the primary winding 35*a*. When the adjusted ignition signal (B) is in an ON state (high level; positive voltage supply from the ignition timing adjustment unit 43), there is a current flow through the base of the power transistor 33*a* so that the power transistor 33*a* is switched on (i.e. switched to an energization state) to permit the flow of an electric current (primary current i1) through the primary winding 35*a*. By such energization of the primary winding 35*a*, magnetic flux energy is accumulated on the ignition coil 35.

When the adjusted ignition signal (B) is switched from the high level to the low level during the flow of the primary current i1 through the primary winding 35*a*, the power transistor 33*a* is switched off to interrupt (stop) the flow of the primary current i1 to the primary winding 35*a*. Then, the magnetic flux density of the ignition coil 35 changes suddenly to develop an ignition voltage through the secondary winding 35*b*. By the application of such an ignition voltage to the spark plug 25, the spark plug 25 generates a spark discharge between the center electrode 25*a* and the ground electrode 25*b* (see FIG. 5(*c*)). At this time, an electric current flows as a secondary current i2 through the secondary winding 35*b*.

Each of the reference ignition signal (A) and the adjusted ignition signal (B) includes information about the timing of switching from the low level to the high level or from the high level to the low level. The timing of switching of the ignition signal from the high level to the low level corresponds to a desired ignition timing (timing of ignition).

[1-5. Operation Processes of Ignition Timing Adjustment Unit]

The operation processes of the ignition timing adjustment unit 43 will be explained below.

First, an explanation will be given of the adjusted ignition timing determination process.

This process is performed to determine the adjusted ignition timing on the basis of the reference ignition signal (A) and to determine the engine rotation speed and the engine rotation speed deviation with the use of the reference ignition signal (A).

As shown in the flowchart of FIG. 7, the timer memory variable N is reset (set to 0) at step (S) 100.

At step 110, the stored rotation speed/knock window variable S is reset. This stored rotation speed/knock window variable S is a variable indicating a time series of the engine rotation speed as sequentially stored at step 240 as well as a time series of the crank angle window for knocking detection as sequentially stored at step 250.

At step 120, the initial value T(0) of the timer T is set to 0.

At step 130, the initial value KNW(0) of the knock detection window KNW is set to 0. This knock detection window KNW refers to a predetermined region (rotation angle range) where there is a possibility of engine knocking and corresponds to a given period starting from the ignition timing and to a region for analysis of the knocking signal.

At step 140, the reference ignition timing (input ignition timing) TIGIN is set as the adjusted ignition timing TIG based on the reference ignition signal (A) from the internal combustion engine control unit 37. The adjust ignition timing TIG set in this step is in fact a not-yet-adjusted value.

At step 150, the ignition signal interval measurement timer T1 is reset.

At step 160, it is judged whether or not the reference ignition signal (A) has been inputted. When the judgment result is positive, the process goes to step 170. When the judgment result is negative, the process stands by in this step.

At step 170, the ignition signal interval measurement timer T1 is started to measure a time elapsed from the input of the reference ignition signal (A).

At step 180, it is again judged whether or not the reference ignition signal (A) has been inputted. When the judgment result is positive, the process goes to step 190. When the judgment result is negative, the process stands by in this step.

Upon receipt of the input of the reference ignition signal (A), the timer memory variable N is counted up at step 190.

At step 200, the time of the current input (Nth input) of the reference ignition signal (A) is stored as a timer count T(N). In other words, the count value of the ignition signal interval measurement timer T1 is stored as the timer count T(N).

At step 210, the difference $\Delta T(N)$ between the time (T(N)) of the current input (Nth input) of the reference ignition signal (A) and the time (T(N−1)) of the previous input (N−1 th input) of the reference ignition signal (A) is calculated. In other words, the time interval between the successive reference ignition signals (A) (that is, the time interval of receipt of the reference ignition signal) is calculated.

In the first embodiment, the time interval between falling edges (high-to-low switching points) of the reference ignition signals (A), rather than the time intervals between leading edges (low-to-high switching points) of the reference ignition signals (A), is determined as the time interval of receipt of the reference ignition signal.

At step 220, the engine rotation speed (rpm) is determined by "2 rotations×60 sec/$\Delta T(N)$" (in the case of 1 ignition/2 rotations in the four-cycle engine).

At step 230, the stored rotation speed/knock window variable S is counted up.

At step 240, the engine rotation speed determined at step 240, which corresponds to the stored rotation speed/knock window variable S, is stored (memorized) as RPN(S).

At step 250, the knock detection window KNW(S) is calculated. Herein, the knock detection window KNW(S) is calculated by a known calculation method as corresponding to the stored rotation speed/knock window variable S. The calculated knock detection window is stored.

At step 260, it is judged whether or not the stored rotation speed/knock window variable S exceeds 2. When the judgment result is positive, the process goes to step 270. When the judgment result is negative, the process goes back to step 180.

At step 270, the after-mentioned knocking detection process is performed to detect the knocking state of the engine.

At step 280, the deviation $\Delta RPN$ of the engine rotation speed (referred to as "engine rotation speed deviation"), which indicates the amount of variation of the engine rotation speed, is determined by calculation of |RPNS(S)−RPNS(S−1)|, i.e., by calculating the absolute value of a difference between the current (Sth) engine rotation speed RPNS(S) and the previous (S−1th) engine rotation speed RPNS(S−1).

At step 290, it is judged whether or not the engine rotation speed deviation $\Delta RPN$ is smaller than a predetermined judgment value RPNs. When the judgment result is positive, the process goes to step 300. When the judgment result is negative, the process goes to step 310. In the first embodiment, the judgment value RPNs is set to 500 rpm.

At step 310, the reference ignition timing TIGIN itself is set as the adjusted ignition timing TIG. The process then goes back to step 180. When the negative judgment is made in step 290, the engine rotation speed deviation $\Delta RPN$ is large so that the operation state of the internal combustion engine is not suitable for adjustment of the ignition timing. In this case, it is inappropriate to advance the ignition timing.

Consequently, the adjusted ignition timing TIG is determined by setting the reference ignition timing TIGIN itself as the adjusted ignition timing TIG at step 310. The reference ignition signal (A) is thus outputted as it is with substantially no adjustment of the ignition timing.

At step 300, it is judged whether or not the knock detection flag KNS has been set to 1 through the after-mentioned knocking detection process for judgement of the occurrence or non-occurrence of engine knocking. When the judgment result is positive, the process goes to step 320. When the judgment result is negative, the process goes to step 330.

In the occurrence of engine knocking, the ignition timing is retarded at step 320 so as to prevent engine knocking. More specifically, the reference ignition timing TIGIN itself is set as the adjusted ignition signal TIG (see FIG. 6). The process then goes back to step 180.

In the non-occurrence of engine knocking, by contrast, it is judged at step 330 whether the ignition timing (adjusted ignition timing TIG) has reached a maximum advance value TIGM. When the judgment result is positive, the process goes to step 340. When the judgment result is negative, the process goes to step 350.

Upon judging that the ignition timing TIG has reached the maximum advance value TIGM, the maximum advance value TIGM is set as the adjusted ignition timing TIG at step 340. The process then goes back to step 180.

Upon judging that the ignition timing TIG has not yet reached the maximum advance value TIGM, the ignition timing is advanced by a predetermined value $\Delta TIG$ at step 350. More specifically, the current adjusted ignition timing TIG is determined by subtracting the predetermined value (correction advance value) $\Delta TIG$ from the adjusted ignition timing TIG. The process then goes back to step 180.

Next, an explanation will be given of the knocking detection process.

This process is performed at a predetermined time interval to detect the knocking state of the engine on the basis of the knocking signal.

As shown in the flowchart of FIG. 8, the knock detection flag KNS is cleared (set to 0) at step 400.

At step 410, it is judged whether or not the ignition timing comes (whether or not it is the timing at which the ignition signal switches from the high level to the low level). When the judgment result is positive, the process goes to step 420. When the judgment result is negative, the process exits.

At step 420, the knock detection window measurement timer is started.

At step 430, it is judged based on the count value of the knock detection window measurement timer whether or not the current time is within a period corresponding to the knock detection window KNW as determined at step 250 (that is, whether or not the current time is within the knock detection window KNW). When the judgment result is positive, the process goes to step 440. When the judgment result is negative, the process goes back to step 430 to repeat the same processing as mentioned above.

At step 440, the knocking signal from the knocking detection unit 41 is set as valid.

At step 450, it is judged based on the count value of the knock detection window measurement timer whether the period corresponding to the knock detection window KNW has elapsed (that is, whether the current time is outside the knock detection window KNW). When the judgment result is positive, the process goes to step 460. When the judgment result is negative, the process goes back to step 440 to repeat the same processing as mentioned above.

At step 460, the knock detection window measurement timer is reset.

At step 470, the peak value KninPk of the knocking signal is calculated.

At step 480, it is judged whether the peak value Kninpk of the knocking signal exceeds a predetermined judgment value as a criterion for judgment of the occurrence or non-occurrence of engine knocking, that is, whether or not engine knocking is occurring. When the judgment result is positive, the process goes to step 490. When the judgment result is negative, the process exits.

At step 490, the knock detection flag KNS is set (to 1) to indicate the occurrence of engine knocking. The process then exits.

Next, an explanation will be given of the signal switching process.

This process is performed to switch whether or not to adjust (correct) the ignition signal on the basis of the information relating to the rotation speed of the internal combustion engine.

As shown in the flowchart of FIG. 9, it is judged at step (S) 600 whether the reference ignition signal (A) has been inputted (i.e. the same judgment as in step 180 of the adjusted ignition timing determination process is made). When the judgment result is positive, the process goes to step 610. When the judgment result is negative, the process stands by in this step At step 610, it is judged whether or not the rotation speed RPN(S) of the internal combustion engine as stored at step 240 of the adjusted ignition timing determination process falls within an adjustment permission range. When the engine rotation speed RPN(S) falls within the adjustment permission range, the positive judgment is made. In this case, the process goes to step 620. When the engine rotation speed RPN(S) does not fall within the adjustment permission range, the negative judgment is made. The process goes to step 640 in this case.

In the first embodiment, the adjustment permission range of the engine rotation speed RPN(S) is set to a range of 2000 rpm or higher. Namely, the positive judgment is made in step 610 when the engine rotation speed RPN(S) is 2000 rpm or higher. When the engine rotation speed RPN(S) is lower than 2000 rpm, the negative judgment is made in step 610.

At step 620, it is judged whether the rotation speed deviation ΔRPN(S) of the internal combustion engine as determined at step 280 of the adjusted ignition timing determination process falls within an adjustment permission range. When the engine rotation speed deviation ΔRPN(S) falls within the adjustment permission range, the positive judgment is made. In this case, the process goes to step 630. When the engine rotation speed deviation ΔRPN(S) does not fall within the adjustment permission range, the negative judgment is made. The process goes to step 640 in this case.

The adjustment permission range of the engine rotation speed deviation ΔRPN(S) is set to a range of 500 rpm or lower. Namely, the positive judgment is made when the engine rotation speed deviation ΔRPN(S) is 500 rpm or lower. When the engine rotation speed deviation ΔRPN(S) is higher than 500 rpm, the negative judgment is made.

At step 630, the adjusted ignition signal indicative of the adjusted ignition timing, which has been adjusted (corrected) by the adjusted ignition timing determination process, is set as the adjusted ignition signal (B) for output to the igniter 33.

At step 640, the reference ignition signal (A) outputted from the internal combustion engine control unit 37 is set, as it is without adjustment (correction), as the adjusted ignition signal (B) for output to the igniter 33.

After the completion of step 630 or step 640, the process goes back to step 600. The processing of steps 600 to 640 is repeatedly performed in the signal switching process. This processing is performed until the stop of the ignition timing adjustment unit 43.

As described above, the signal switching process allows output of the adjusted ignition signal, which has been adjusted (corrected) by the adjusted ignition timing determination process, to the igniter 33 in the case where the engine rotation speed RPN(S) and the engine rotation speed deviation ΔRPN(S) fall within the respective adjustment permission ranges (i.e. in the case where the positive judgments are made in steps 610 and 620).

On the other hand, the signal switching process allows output of the reference ignition signal (A) from the internal combustion engine control unit 37 to the igniter 33 as it is in the case where the engine rotation speed RPN(S) does not fall within the adjustment permission range or the engine rotation speed deviation ΔRPN(S) does not fall within the adjustment permission range (i.e. in the case whether the negative judgement is made in at least one of steps 610 and 620).

In this way, the signal switching process permits switching of whether or not to adjust (correct) the ignition timing according to the operation state (such as rotation speed RPN(S) and rotation speed deviation ΔRPN(S)) of the internal combustion engine.

[1-6. Effects]

The effects of the first embodiment will be explained below.

In the first embodiment, the knocking detection unit 41 and the ignition timing adjustment unit 43 are electrically connected and integrated together through the connection cable 45 in the ignition timing control device 31. The ignition timing adjustment unit 43 receives not only the knocking signal from the knocking detection unit 41 but also the reference ignition signal (A) from the internal combustion engine control unit 37.

Thus, the ignition timing adjustment unit 43 is able to adjust the ignition timing to a proper ignition timing by ignition timing advance control or retard control on the basis of the knocking signal inputted from the knocking detection unit 41 and the reference ignition signal (A) inputted from the internal combustion engine control unit 37.

In particular, the ignition timing control device 31 of the first embodiment is applicable to engines (such as conventional general purpose engines and motorcycle engines) on which knocking control has not been performed. It is therefore possible, by applying the ignition timing control device of the first embodiment to the conventional electronic engine control unit, to obtain remarkable effects such as elimination of the need to reconsider the design of the internal combustion engine control unit 37 for ignition timing control and significant reduction of the effort (work load) and cost for such design reconsideration.

Further, the knocking detection unit 41 is mounted to the cylinder block 49 of the internal combustion engine 1 and electrically connected to the ignition timing adjustment unit 43 and to the internal combustion engine control unit 37 in the first embodiment. This system configuration is advantageous over the conventional system configuration in that it is easy to apply the ignition timing control device.

In the first embodiment, the knocking detection unit 41 and the ignition timing adjustment unit 43 can be arranged apart from each other by the length of the connection cable 45 as the knocking detection unit 41 and the ignition timing adjustment unit 43 are integrated together through the connection cable 45.

It is thus possible to reduce the influence of heat or vibration (of the engine body 3) on the ignition timing adjustment unit 43 and effectively suppress the occurrence of a failure in the ignition timing adjustment unit 43 by arranging the ignition timing adjustment unit 43 at a location apart from the knocking detection unit 41 that is mounted to the engine cylinder block 49.

In the first embodiment, the ignition timing control device 31 is configured to calculate the engine rotation speed RPN(S) and the engine rotation speed deviation ΔRPN(S) based on the reference ignition signal, and then, execute the signal switching process to switch the output of the ignition signal to the igniter 33 according to the operation state (such as rotation speed RPN(S) and rotation speed deviation ΔRPN(S)) of the internal combustion engine.

More specifically, the ignition timing control device 31 outputs, to the igniter 33, the adjusted ignition signal as adjusted (corrected) by the adjusted ignition timing determination process (step S630) in the case where the engine rotation speed RPN(S) and the engine rotation speed deviation ΔRPN(S) fall within the respective adjustment permission ranges (i.e. in the case where the positive judgments are made in steps 610 and 620).

The ignition timing control device 31 outputs, to the igniter 33, the reference ignition signal (A) as it is obtained from the internal combustion engine control unit 37 without adjustment (correction) (step S640) in the case where the engine rotation speed RPN(S) does not fall within the adjustment permission range or the engine rotation speed deviation ΔRPN(S) does not fall within the adjustment permission range (i.e. in the case whether the negative judgement is made in at least one of steps 610 and 620).

When at least one of the engine rotation speed RPN(S) and the engine rotation speed deviation ΔRPN(S) does not fall within the adjustment permission range, the operation state of the internal combustion engine 1 is not suitable for adjustment of the ignition timing so that the ignition timing may not properly be adjusted by the ignition timing adjustment unit 43.

For this reason, the ignition timing control device 31 outputs the reference ignition signal (A) without adjustment of the ignition timing, rather than outputs the adjusted ignition signal as adjusted (corrected) by the adjusted ignition timing control determination process, to the igniter 33 in the case where at least one of the engine rotation speed RPN(S) and the engine rotation speed deviation ΔRPN(S) does not fall within the adjustment permission range.

When the engine rotation speed RPN(S) and the engine rotation speed deviation ΔRPN(S) fall within the respective adjustment permission ranges (i.e. in the case where the positive judgments are made in steps 610 and 620), on the other hand, the operation state of the internal combustion engine 1 is suitable for adjustment of the ignition timing. In this case, the ignition timing control device 31 outputs the adjusted ignition signal as adjusted (corrected) by the adjusted ignition timing control determination process for suppression of engine knocking.

In the ignition timing control device 31, the rotation speed range for adjustment (correction) of the reference ignition signal (A) is not set to the full speed range and is limited to the predetermined range. The resolution of the microcomputer of the ignition timing adjustment unit 43 is increased as the rotation speed range for adjustment (correction) of the reference ignition signal (A) is limited to the predetermined range.

As there is an upper limit on the timer count of the microcomputer, the resolution of the microcomputer needs to be lowered so as to monitor the reference ignition signal in a low engine rotation speed range. In the first embodiment, however, more precise monitoring of the reference ignition signal is enabled by limiting the rotation speed range for adjustment (correction) of the reference ignition signal (A) to the predetermined range, rather than the full speed range, and thereby increasing the resolution of the microcomputer.

It is thus possible for the ignition timing control device 31 to monitor the ignition signal in more precise units of rotation speed and accomplish more precise control of the ignition timing for more assured suppression of engine knocking.

The ignition timing control system 38 is provided with the ignition timing control device 31. Even when the internal combustion engine is not equipped with ignition timing control and knocking suppression functions, it is possible by the application of the ignition timing control system 38 to easily perform ignition timing control on the internal combustion engine. It is also possible to avoid adverse influence on the operation state of the internal combustion engine in a condition that the operation state of the internal combustion engine is not suitable for adjustment of the ignition timing.

[1-7. Correspondence of Claims]

Herein, the correspondence of claims to the first embodiment will be discussed below.

The signal outputted from the knocking detection unit 41 corresponds to an example of the claimed knocking signal. The reference ignition signal (A) outputted from the internal combustion engine control unit 37 corresponds to an example of the claimed ignition timing signal. The adjusted ignition signal (B) indicative of the adjusted ignition timing TIG as adjusted (corrected) by the adjusted ignition timing determination process corresponds to an example of the claimed adjusted ignition signal.

The ignition timing adjustment unit 43, which executes steps 200 to 220 and 280, corresponds to an example of the claimed rotation speed-related information determination portion. The ignition timing adjustment unit 43, which executes the signal switching process, corresponds to an example of the claimed signal switching portion. The engine rotation speed RPN(S) and the engine rotation speed deviation ΔRPN(S) correspond to an example of the claimed rotation speed-related information. In particular, the engine rotation speed deviation ΔRPN(S) corresponds to an example of the claimed rotation speed variation amount. The internal combustion engine control unit 37 corresponds to an example of the claimed external electronic control unit.

2. Second Embodiment

The second embodiment will be explained below. An explanation of the same parts and portions of the second embodiment as those of the first embodiment will be omitted herefrom.

Figure 10A:
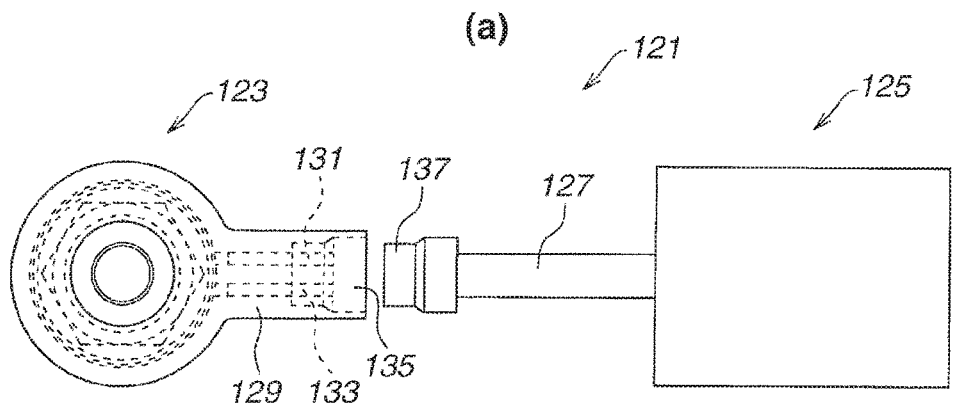
FIG. 10A is a plan view of an ignition timing control device according to a second embodiment of the present invention.

As in the case of the first embodiment, an ignition timing control device 121 according to the second embodiment has an integral configuration with a knocking detection unit 123, an ignition timing adjustment unit 125 and a connection cable 127 (for connection of these units) as shown in FIG. 10A.

The second embodiment is particularly characterized in that, whereas the ignition timing adjustment unit 125 and the connection cable 127 are undetachably integrated with each other, the knocking detection unit 123 and the connection cable 127 are detachable from each other as shown in the drawing.

More specifically, a connector part 129 of the knocking detection unit 123 has a recessed portion 135 through which first and second output terminals 131 and 133 are exposed. The recessed portion 135 and a connector part 137 of the connection cable 127 are adapted to allow detachable connection therebetween. The knocking detection unit 123 and the ignition timing adjustment unit 125 are thus detachably integral with each other.

It is therefore possible in the second embodiment to obtain the same effects as in the first embodiment. Further, the second embodiment is advantageous in that the knocking detection unit 123 and the connection cable 127 are detachable from with each other so that, in the event of a failure in either one of the knocking detection unit 123 and the ignition timing adjustment unit 125, it is possible to separate these units and replace only the failing unit.

3. Third Embodiment

The third embodiment will be explained below. An explanation of the same parts and portions of the third embodiment as those of the second embodiment will be omitted herefrom.

Figure 10B:
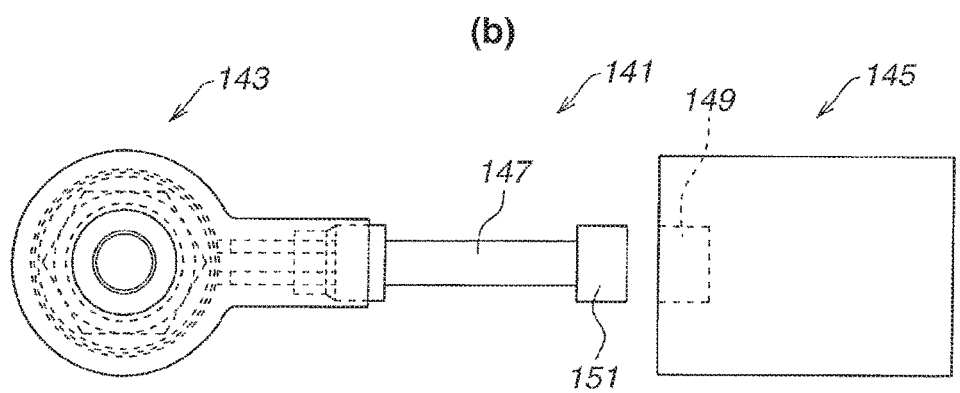
FIG. 10B is a plan view of an ignition timing control device according to a third embodiment of the present invention.

As in the case of the first embodiment, an ignition timing control device 141 according to the third embodiment has an integral configuration with a knocking detection unit 143, an ignition timing adjustment unit 145 and a connection cable 147 (for connection of these units) as shown in FIG. 10B.

The third embodiment is particularly characterized in that, whereas the knocking detection unit 143 and the connection cable 147 are undetachably integrated with each other, the ignition timing adjustment unit 145 and the connection cable 147 are detachable from each other as shown in the drawing.

More specifically, the ignition timing adjustment unit 145 has a recessed connector part 149. The connector part 149 and a connector part 151 of the connection cable 147 are adapted to allow detachable connection therebetween. The knocking detection unit 143 and the ignition timing adjustment unit 145 are thus detachably integral with each other.

It is therefore possible in the third embodiment to obtain the same effects as in the second embodiment.

4. Fourth Embodiment

The fourth embodiment will be explained below. An explanation of the same parts and portions of the fourth embodiment as those of the second embodiment will be omitted herefrom.

Figure 10C:
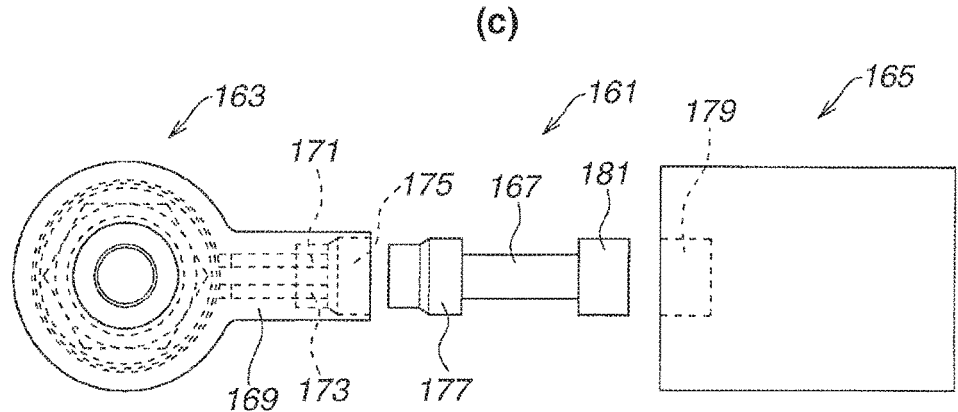
FIG. 10C is a plan view of an ignition timing control device according to a fourth embodiment of the present invention.

As in the case of the first embodiment, an ignition timing control device 161 according to the fourth embodiment has an integral configuration with a knocking detection unit 163, an ignition timing adjustment unit 165 and a connection cable 167 (for connection of these units) as shown in FIG. 10C.

The fourth embodiment is particularly characterized in that: the knocking detection unit 163 and the connection cable 167 are detachable from each other; and the ignition timing adjustment unit 165 and the connection cable 167 are detachable from each other as shown in the drawing.

As in the case of the second embodiment, a connector part 169 of the knocking detection unit 163 has a recessed portion 175 through which first and second output terminals 171 and 173 are exposed; and the recessed portion 175 and a first connector part 177 of the connection cable 167 are adapted to allow detachable connection therebetween.

Further, the ignition timing adjustment unit 165 has a recessed connector part 179. The connector part 179 and a second connector part 181 of the connection cable 167 are adapted to allow detachable connection therebetween.

Thus, the knocking detection unit 163 and the ignition timing adjustment unit 165 are detachably integral with each other in the ignition timing control device 161.

It is therefore possible in the fourth embodiment to obtain the same effects as in the second embodiment.

5. Fifth Embodiment

The fifth embodiment will be explained below. An explanation of the same parts and portions of the fifth embodiment as those of the first embodiment will be omitted herefrom.

Figure 11A:
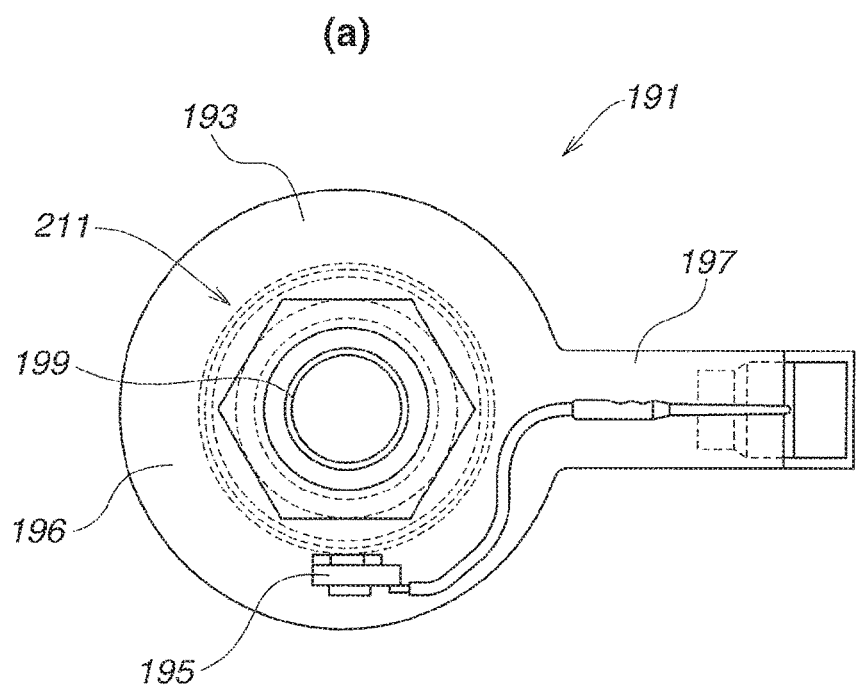
FIG. 11A is a plan view of an ignition timing control device according to a fifth embodiment of the present invention.
Figure 11B:
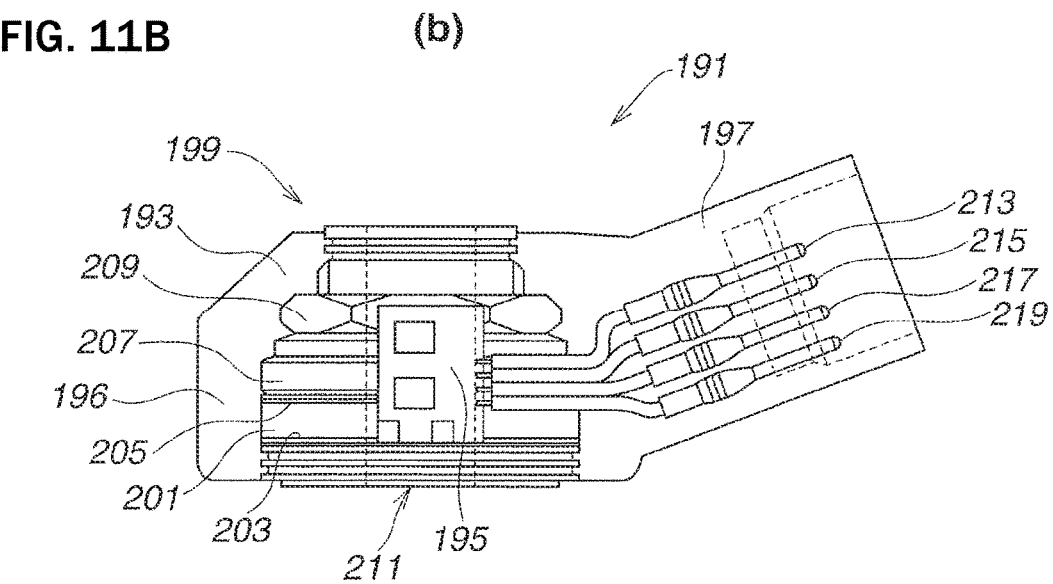
FIG. 11B is a front view of the ignition timing control device according to the fifth embodiment of the present invention.

As shown in FIG. 11A and FIG. 11B, an ignition timing control device 191 according to the fifth embodiment has a knocking detection unit 193 as in the case of the first embodiment, but has an ignition timing adjustment unit 195 arranged in the knocking detection unit 193 without a connection cable. In FIG. 11A and FIG. 11B, the internal configuration of the ignition timing control device is illustrated in perspective view through a resin mold.

More specifically, the knocking detection unit 193 includes a body part 196 and a connector part 197 in the fifth embodiment. The body part 196 has, accommodated in the resin mold, an actuation portion 211 in which a piezoelectric element 201, a pair of electrode plates 203 and 205, an weight 207 and a nut 209 are fitted in a metal shell 199. The ignition timing adjustment'unit 195 is arranged on a surface of the actuation portion 211.

Output terminals (not shown) are led from the respective electrode plates 203 and 205 and connected to the ignition timing adjustment unit 195. The ignition timing adjustment unit 195 has an input terminal 213 for receiving an ignition signal (reference ignition signal (A)) from an internal combustion engine control unit, an output terminal 215 for outputting the ignition signal (adjusted ignition signal (B) or, in the case where an abnormality is detected, reference ignition signal (A)) to an igniter and a pair of power terminals 217 and 219 for supplying power to the ignition timing adjustment unit 195.

It is therefore possible in the fifth embodiment to obtain the same effects as in the first embodiment. It is also possible to realize compactization of the ignition timing control device in the fifth embodiment.

6. Sixth Embodiment

The sixth embodiment will be explained below. An explanation of the same parts and portions of the sixth embodiment as those of the first embodiment will be omitted herefrom.

The sixth embodiment refers to the case where the present invention is applied to a general purpose engine. Further, a magnet is provided so as to rotate in synchronism with rotation of the engine such that a rotation speed and crank angle of the engine are determined by means of the magnet in the sixth embodiment.

Figure 12:
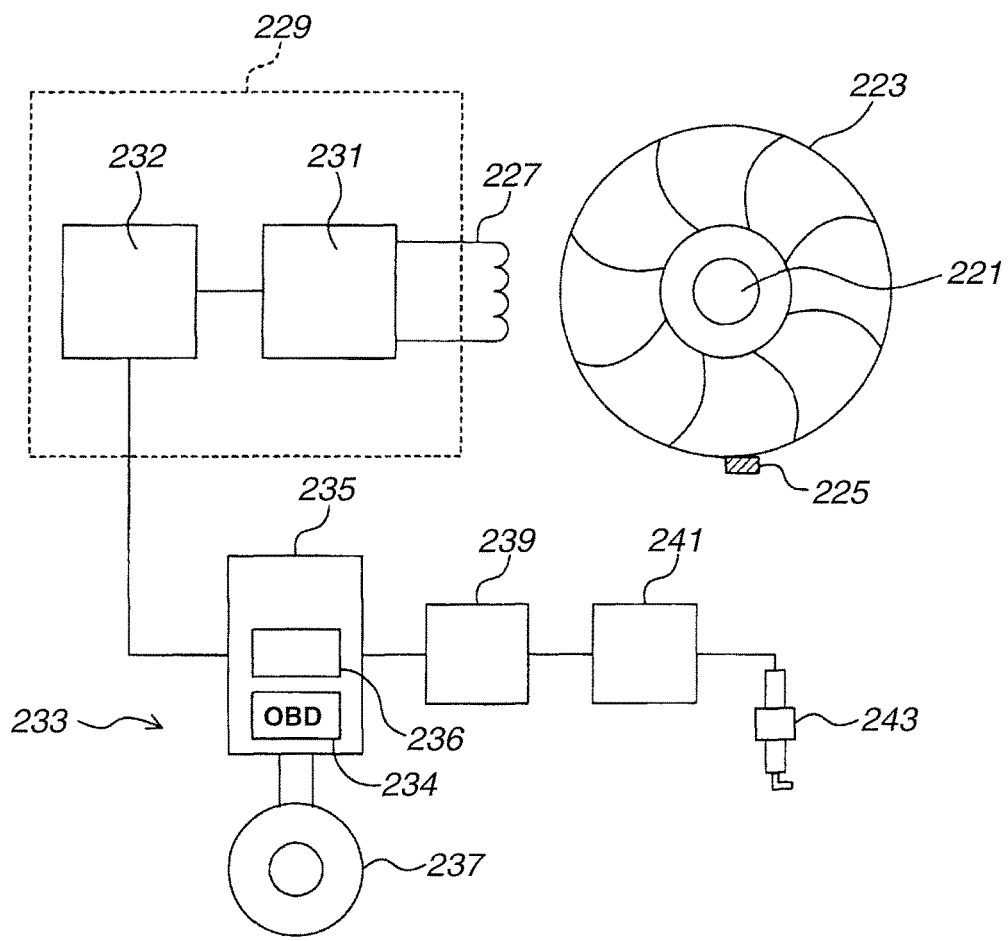
FIG. 12 is a schematic diagram of a control system with an ignition timing control device according to a sixth embodiment of the present invention.

As shown in FIG. 12, a flywheel 223 is attached to an output shaft 221 of the engine body. The magnet 225 is mounted on the outer periphery of the flywheel 223.

A pulsar coil 227 is disposed adjacent to the flywheel 223 so as to output a signal (alternating current signal) responsive to the degree of approach/separation of the magnet 225. The output signal of the pulsar coil 227 is inputted into an electronic control device 229.

The electronic control unit 229 has a detection circuit 231 to detect the degree of approach/separation of the magnet 225 based on the output signal of the pulsar coil 227, a known microcomputer 232 and the like.

The pulsar coil signal is obtained every time the magnet 225 passes through the vicinity of the pulsar coil 227. Thus, the electronic control unit is able to determine the crank angle, which corresponds to the mounting position of the magnet 225, and the engine rotation speed from the pulsar coil signal and set a reference ignition timing according to e.g. the engine rotation speed.

An ignition timing control device 233, which is the same in configuration as that of the first embodiment, is coupled to the microcomputer 232 of the electronic control device 229 in the sixth embodiment.

When the ignition signal (reference ignition signal (A)) is inputted from the microcomputer 232 into an ignition timing adjustment unit 235 of the ignition timing control device, the ignition timing adjustment unit 235 adjusts the ignition timing based on a state of occurrence of engine knocking detected by a knocking detection unit 237 of the ignition timing control device as in the case of the first embodiment.

The thus-adjusted ignition signal (adjusted ignition signal (B)) is outputted to an igniter 239. When a high voltage is developed from an ignition coil 241 by operation of the igniter 239 and applied to a spark plug 243, the spark plug 243 generates a spark discharge at a proper timing.

The ignition timing adjustment unit 235 is equipped with an OBD system 234 and an abnormality information storage memory 236.

As in the case of the first embodiment, the ignition timing adjustment unit 235 is configured to calculate the engine rotation speed RPN(S) and the engine rotation speed deviation ΔRPN(S) based on the ignition signal (reference ignition signal (A)) from the microcomputer 232, and then, execute the signal switching process to switch the output of the ignition signal to the igniter 239 according to the operation state (more specifically, rotation speed RPN(S) and rotation speed deviation ΔRPN(S)) of the internal combustion engine.

It is therefore possible in the sixth embodiment to obtain the same effects as in the first embodiment.

As a modified example of to the above embodiment, it is feasible to mount a magnet (on the flywheel) in the same manner as above and dispose an ignition coil at a position adjacent to the magnet such that an ignition coil develops a high voltage for driving of a spark plug according to the degree of approach/separation of the magnet as disclosed in e.g. Japanese Laid-Open Patent Publication No. H10-259777.

Figure 13:
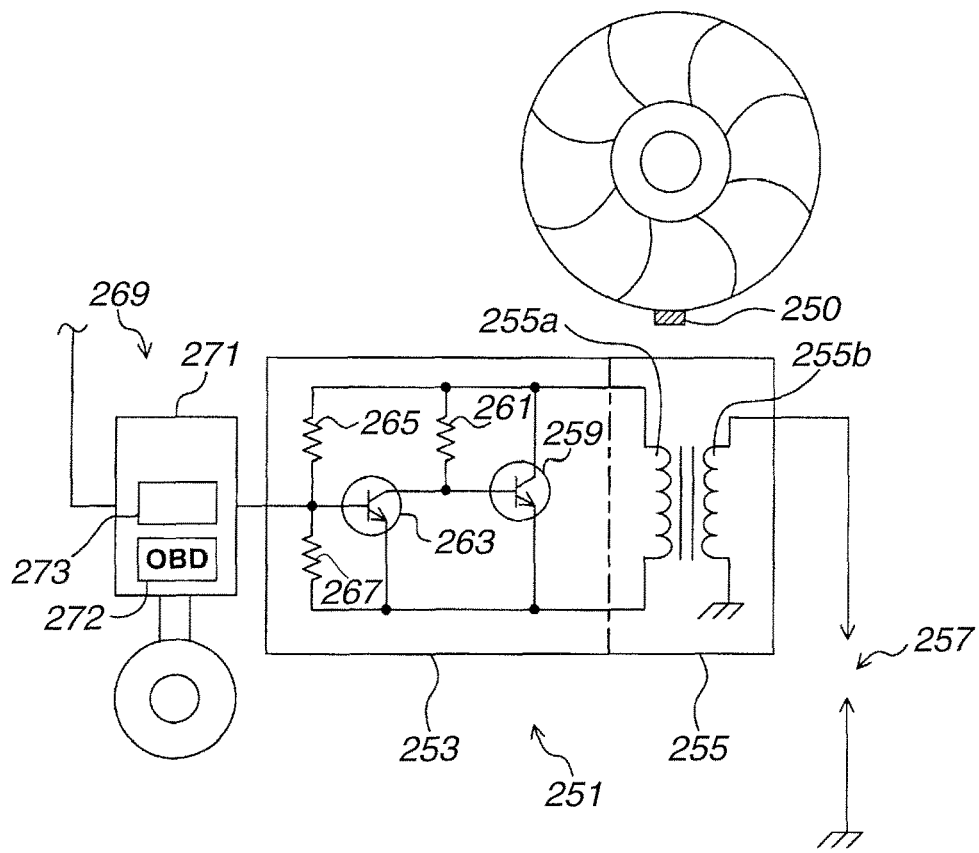
FIG. 13 is a schematic diagram of a control system with an ignition timing control device according to a modification of the sixth embodiment of the present invention.

In this modified example, an ignition drive circuit 251 is used as shown in FIG. 13. An igniter 253 and the ignition coil 255 are provided in the ignition drive circuit 251. The ignition coil 255 has a primary winding 255a to generate a current according to the degree of approach/separation of the magnet 250 and a secondary winding 255b connected to a spark plug 257.

The igniter 253 includes a first transistor 259, a first resistor 261, a second transistor 263 and second and third resistors 265 and 267. The first transistor 259 has a collector connected to one end of the primary winding 255a and an emitter connected to the other end of the primary winding 255a. The first resistor 261 is arranged between the collector and base of the first transistor 259 so as to supply base power to the first transistor 259. The second transistor 263 has a collector connected to the base of the first transistor 259 and an emitter connected to the emitter of the first transistor 259. The second and third resistors 265 and 267 are arranged so as to divide the voltage between the ends of the primary winding 255a and apply the divided voltage to a base of the second transistor 263.

An ignition timing control device 269 has an ignition timing adjustment unit 271 connected to the base of the second transistor 263 so as to adjust an ignition timing by output of an adjusted ignition signal (B) from the ignition timing adjustment unit 271 (upon receipt of a reference ignition signal (A) from the electronic control unit 229) as in the case of the first embodiment.

The ignition timing adjustment unit 271 is equipped with an OBD system 272 and an abnormality information storage memory 273.

As in the case of the first embodiment, the ignition timing adjustment unit 271 is configured to calculate the engine rotation speed RPN(S) and the engine rotation speed deviation ΔRPN(S) based on the ignition signal (reference ignition signal (A)) from the microcomputer, and then, execute the signal switching process to switch the output of the ignition signal to the igniter 253 according to the operation state (more specifically, rotation speed RPN(S) and rotation speed deviation ΔRPN(S)) of the internal combustion engine.

It is therefore possible in the above modified example to obtain the same effects as in the first embodiment.

7. Seventh Embodiment

The seventh embodiment will be explained below. An explanation of the same parts and portions of the seventh embodiment as those of the first embodiment will be omitted herefrom.

In the seventh embodiment, the processing executed by an ignition timing adjustment unit 285 is partially different from that of the first embodiment. More specifically, an adjusted ignition timing determination process executed by the ignition timing adjustment unit 285 includes processing steps corresponding to the signal switching process of the first embodiment.

[7-1. Basic Configuration of Seventh Embodiment]

First, the basic configuration of the seventh embodiment will be explained below.

Figure 14:
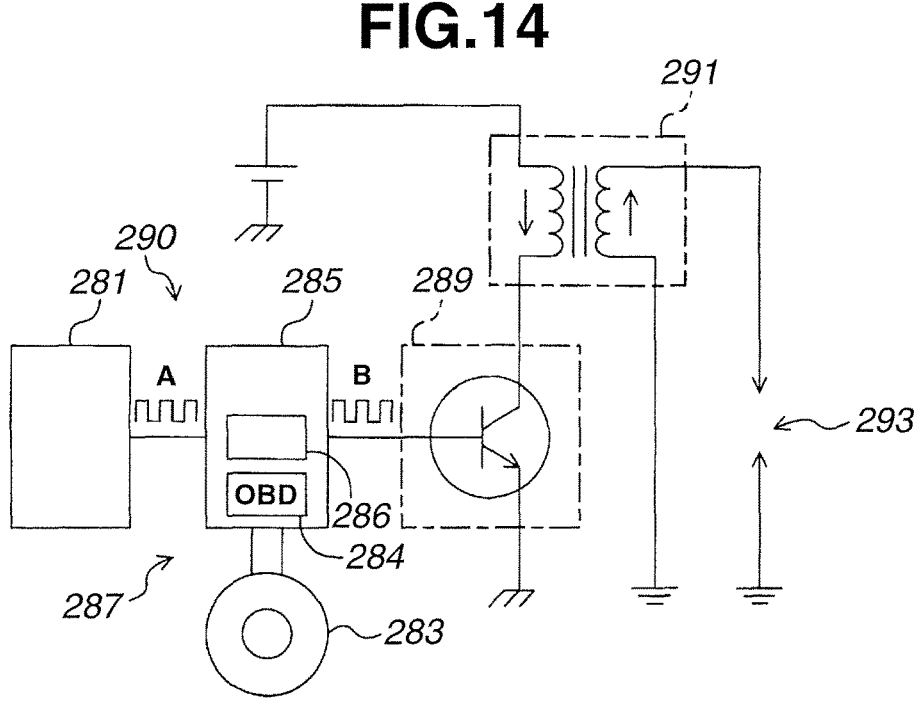
FIG. 14 is an electrical block diagram of an ignition timing control device and its peripheral devices according to a seventh embodiment of the present invention.

As shown in FIG. 14, a system according to the seventh embodiment includes an internal combustion engine control unit 281, an ignition timing control device 287, an igniter 289, an ignition coil 291, a spark plug 293 and the like as in the case of the first embodiment. The ignition timing control device 287 has at least a knocking detection unit 283 and the ignition timing adjustment unit 285.

In the seventh embodiment, a reference ignition signal (ignition signal A), which includes information about an ignition timing, is outputted from the internal combustion engine control device 281 to the ignition timing adjustment unit 285; and an adjusted ignition signal is outputted from the ignition timing adjustment unit 285 to the igniter 289.

The system with the internal combustion engine control unit 281 and the ignition timing control device 287 is referred to as an ignition timing control system 290 (the same applies to the following).

The ignition timing adjustment unit 285 is equipped with an OBD system 284 and an abnormality information storage memory 286.

The seventh embodiment is characterized in that the adjusted ignition timing determination process executed by the ignition timing adjustment unit 285 includes processing steps corresponding to the signal switching process of the first embodiment as mentioned above.

The ignition timing adjustment unit 285 is configured to, based on the adjusted ignition timing TIG determined by the adjusted ignition timing determination process, output the adjusted ignition signal B to the igniter 289.

[7-2. Control Processing of Seventh Embodiment]

Next, the control processing of the seventh embodiment will be explained below.

The adjusted ignition timing determination process executed by the ignition timing adjustment unit will be now explained below.

Figure 15:
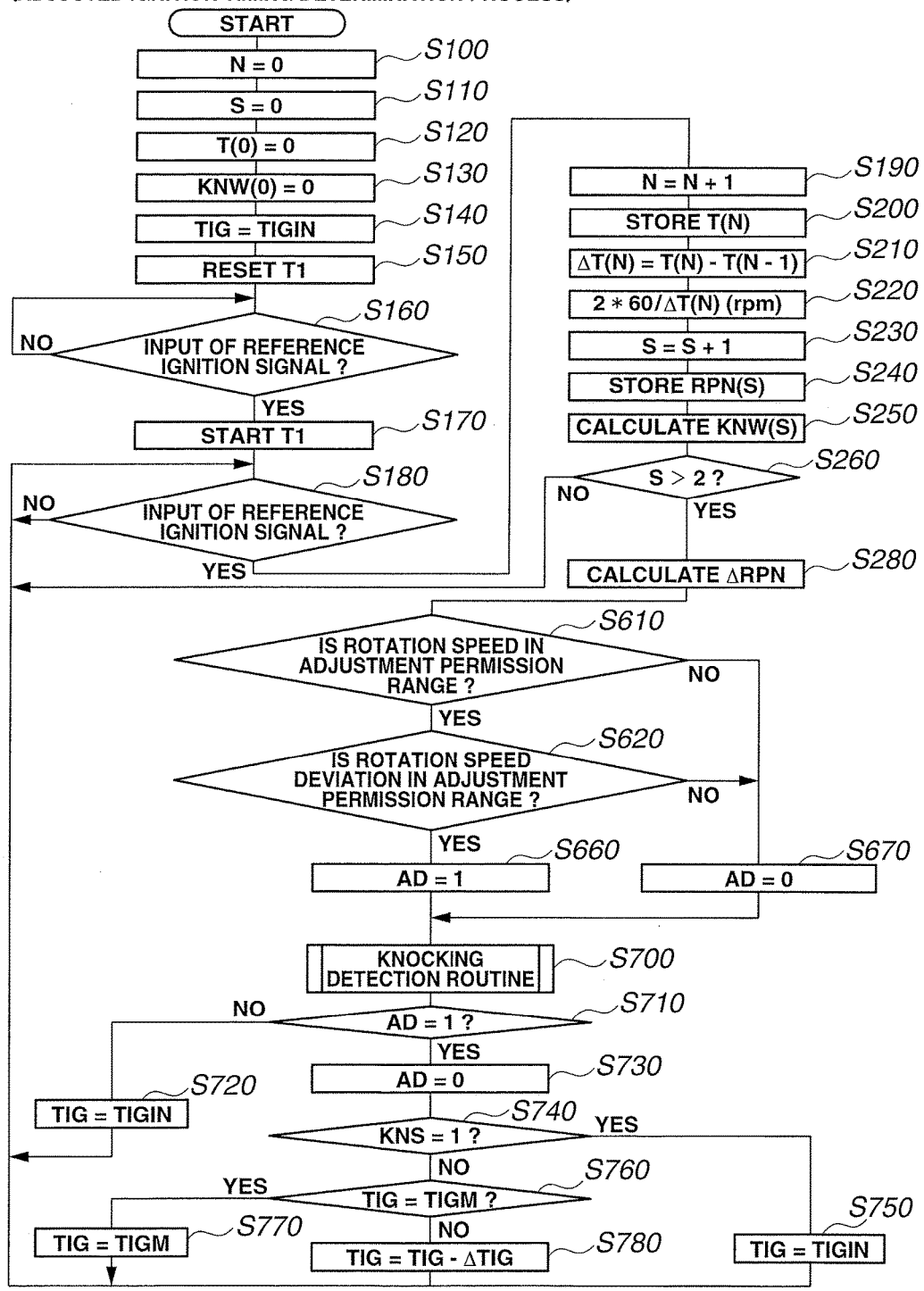
FIG. 15 is a flowchart for an adjusted ignition timing determination process executed by an ignition timing adjustment unit of the ignition timing control device according to the seventh embodiment of the present invention.

As shown in the flowchart of FIG. 15, the processing of steps 100 to 250 of the seventh embodiment is the same as that of steps 100 to 250 of the first embodiment. An explanation of these steps will be thus omitted herefrom.

At subsequent step 260, it is judged whether the stored engine speed/knock window variable S exceeds 2. When the judgment result is positive, the process goes to step 280. When the judgment result is negative, the process goes back to step 180.

At step 280, the deviation ΔRPN of the engine rotation speed (referred to as "engine rotation speed deviation"), which indicates the amount of variation of the engine rotation speed, is determined by calculation of |RPNS(S)−RPNS(S−1)|, i.e., by calculating the absolute value of a difference between the current (Sth) engine rotation speed RPNS(S) and the previous (S−1th) engine rotation speed RPNS(S−1).

At subsequent step 610, it is judged whether the rotation speed RPN(S) of the internal combustion engine as stored at step 240 falls within an adjustment permission range. When the engine rotation speed RPN(S) falls within the adjustment permission range, the positive judgment is made. In this case, the process goes to step 620. When the engine rotation speed RPN(S) does not fall within the adjustment permission range, the negative judgment is made. The process goes to step 670 in this case. In the seventh embodiment, the adjustment permission range of the engine rotation speed RPN(S) is set to the same range as in the first embodiment.

At step 620, it is judged whether the rotation speed deviation ΔRPN(S) of the internal combustion engine as determined at step 280 falls within an adjustment permission range. When the engine rotation speed deviation ΔRPN(S) falls within the adjustment permission range, the positive judgment is made. In this case, the process goes to step 660. When the engine rotation speed deviation ΔRPN(S) does not fall within the adjustment permission range, the negative judgment is made. The process goes to step 670 in this case. In the seventh embodiment, the adjustment permission range of the engine rotation speed deviation ΔRPN(S) is set to the same range as in the first embodiment.

At step 660, the flag AD is set to 1 based on the judgement that the engine rotation speed RPN(S) and the engine rotation speed deviation ΔRPN(S) fall within the respective adjustment ranges (i.e. the positive judgements are made in both of steps 610 and 620). The process then goes to step 700.

The flag AD indicates whether or not the operation state of the internal combustion engine is suitable for adjustment of the ignition timing. The flag AD is set to 1 when the operation state of the internal combustion engine is suitable for adjustment of the ignition timing. When the operation state of the internal combustion engine is not suitable for adjustment of the ignition timing, the flag AD is set to 0.

At step 670, the flag AD is set to 0 based on the judgment that at least one of the engine rotation speed RPN(S) and the engine rotation speed deviation ΔRPN(S) does not fall within the adjustment range (i.e. the negative judgment is made in at least one of steps 610 and 620). The process then goes to step 700.

The above processing of steps 280, 610 and 620 is the same as that of steps 280, 610 and 620 of the first embodiment.

After the completion of step 660 or step 670, the process goes to step 700.

At step 700, the knocking detection process is executed in the same manner as in the first embodiment (see FIG. 8) to detect the occurrence of engine knocking.

At subsequent step 710, it is judged whether the flag AD is set to 1. When the judgment result is positive, the process goes to step 730. When the judgment result is negative, the process goes to step 720.

At step 720, the reference ignition signal TIGIN itself is set as the adjusted ignition signal TIG based on the judgment that the operation state of the internal combustion engine is not suitable for adjustment of the ignition timing. Then, the process goes back to step 180.

At step 730, the flag AD is set to 0.

Upon judging that the operation state of the internal combustion engine 1 is suitable for adjustment of the ignition timing, it is judged at step 740 whether or not the knock detection flag KNS has been set to 1 through the knocking detection process for judgement of the occurrence or non-occurrence of engine knocking. When the judgment result is positive, the process goes to step 750. When the judgment result is negative, the process goes to step 760.

In the occurrence of engine knocking, the ignition timing is retarded at step 750 so as to prevent engine knocking. More specifically, the reference ignition timing TIGIN itself is set as the adjusted ignition signal TIG at step 750. The process then goes back to step 180.

In the non-occurrence of engine knocking, by contrast, it is judged at step 330 whether the ignition timing (adjusted ignition timing TIG) has reached a maximum advance value TIGM. When the judgment result is positive, the process goes to step 770. When the judgment result is negative, the process goes to step 780.

Upon judging that the ignition timing TIG has reached the maximum advance value TIGM, the maximum advance value TIGM is set as the adjusted ignition timing TIG at step 770. The process then goes back to step 180.

Upon judging that the ignition timing TIG has not yet reached the maximum advance value TIGM, the ignition timing is advanced by a predetermined value ΔTIG at step 780. The process then goes back to step 180.

The above processing of steps 720, 740 and 750 to 780 is the same as that of steps 310, 300 and 320 to 350 of the first embodiment.

[7-3. Effects of Seventh Embodiment]

The effects of the seventh embodiment will be explained below.

In the seventh embodiment, the ignition timing control device is able to adjust (correct) the ignition timing as in the case of the first embodiment.

It is therefore possible in the seventh embodiment, at the time of properly adjusting (correcting) the ignition timing by advance control or retard control with reference to the knocking signal, to obtain remarkable effects such as elimination of the need to reconsider the design of the internal combustion engine control unit 281 for such ignition timing control and significant reduction of the effort (work load) and cost for such design reconsideration as in the case of the first embodiment.

It is also possible in the seventh embodiment, as in the case of the first embodiment, to avoid adverse influence on the operation state of the internal combustion engine by outputting the reference ignition signal (A) without adjustment of the ignition timing in a condition that the operation state of the internal combustion engine 1 is not suitable for adjustment of the ignition timing.

It is further possible in the seventh embodiment, as in the case of the first embodiment, to suppress the occurrence of engine knocking by adjusting (correcting) the ignition signal with reference to the knocking signal and outputting the adjusted ignition signal in a condition that the operation state of the internal combustion engine 1 is suitable for adjustment of the ignition timing as in the case of the first embodiment.

[7-4. Correspondence of Claims]

Herein, the correspondence of claims to the seventh embodiment will be discussed below.

The ignition timing adjustment unit 285, which executes steps 200 to 220 and 280, corresponds to an example of the claimed rotation speed-related information determination portion. The ignition timing adjustment unit 285, which executes steps 610, 620, 660 and 670, corresponds to an example of the claimed signal switching portion.

8. Eighth Embodiment

The eighth embodiment will be explained below. An explanation of the same parts and portions of the eighth embodiment as those of the first embodiment will be omitted herefrom.

The eighth embodiment is different from the first embodiment, at least in that, in the eighth embodiment, a selector switch 352 is provided to select and switch a signal path from an internal combustion engine control unit 337 to an igniter 333.

[8-1. Basic Configuration of Eighth Embodiment]

The basic configuration of the eighth embodiment will be first explained below.

Figure 16:
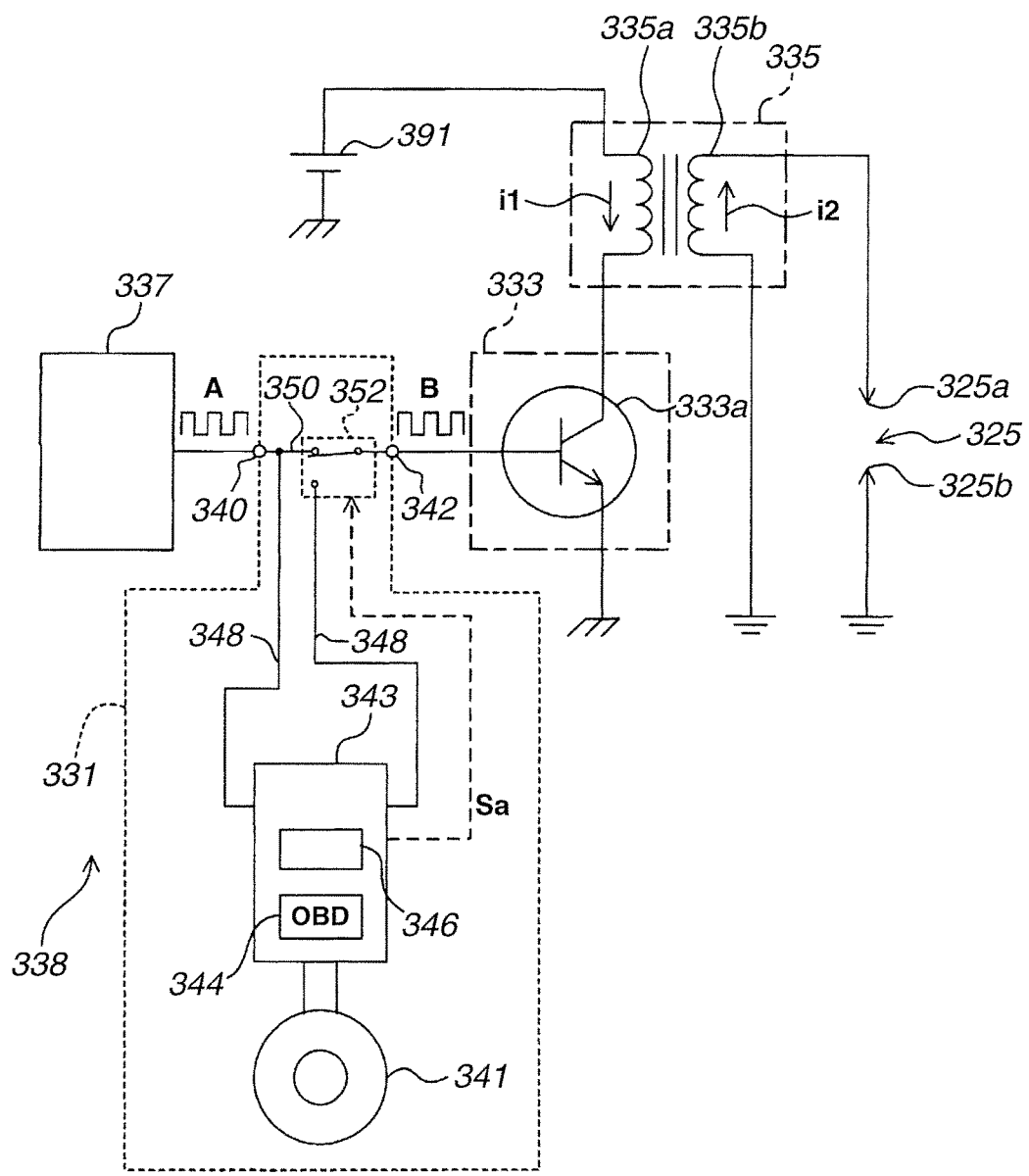
FIG. 16 is an electrical block diagram of an ignition timing control device and its peripheral devices according to an eighth embodiment of the present invention.

As shown in FIG. 16, a system according to the eighth embodiment includes the internal combustion engine control unit 337, an ignition timing control device 331, the igniter 333 (power transistor 333a), an ignition coil 335 (primary and secondary windings 335a and 335b), a spark plug 325 (center electrode 325a and ground electrode 325b), a battery 391 etc. as in the case of the first embodiment.

The ignition timing control device 331 has a knocking detection unit 341, an ignition timing adjustment unit 343 and the selector switch 352.

The ignition timing adjustment unit 343 is equipped with an OBD system 344 and an abnormality information storage memory 346.

In the eighth embodiment, a reference ignition signal (ignition signal (A)), which includes information about an ignition timing, is outputted from the internal combustion engine control unit 337 to the ignition timing control device 331; and an adjusted ignition signal (B) is outputted from the ignition timing control device 331 to the igniter 333.

The system with the internal combustion engine control unit 337 and the ignition timing control device 331 is referred to as an ignition timing control system 338 (the same applies to the following).

The selector switch 352 is used to switch the signal path from the internal combustion engine control unit 337 (in other words, an input part 340 of the ignition timing control device 331) to an output part 342 of the ignition timing control device 331 between a first path 348 that passes through the ignition timing adjustment unit 343 and a second path 350 that does not pass through the ignition timing adjustment unit 343.

Herein, the selector switch 352 selects the signal path based on a switching command signal Sa from the ignition timing adjustment unit 343. When the switching command signal Sa is at a high level, the selector switch 352 selects the first path 348 as the signal path. When the switching command signal Sa is at a low level, the selector switch 352 selects the second path 350 as the signal path.

[8-2. Control Processing of Eighth Embodiment]

The control processing of the eighth embodiment will be next explained below.

As in the case of the first embodiment, the ignition timing adjustment unit 343 executes an adjusted ignition timing determination process as shown in FIG. 7 and a knocking detection process as shown in FIG. 8.

Herein, an explanation will be given of a signal switching process of the ignition timing adjustment unit 343 as the processing contents of the signal switching process of the eighth embodiment are different from those of the first embodiment.

Figure 17:
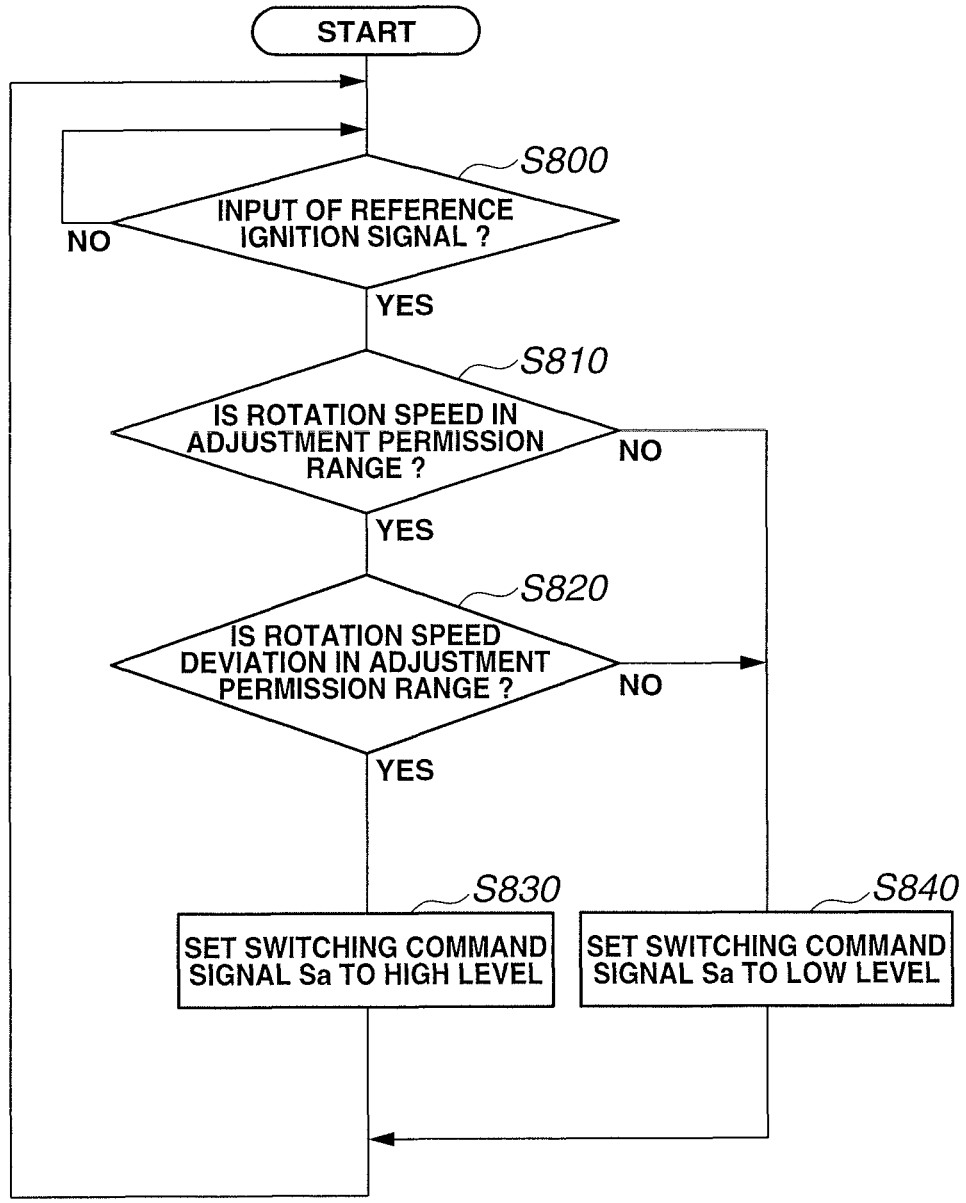
FIG. 17 is a flowchart for a signal switching process executed by an ignition timing adjustment unit of the ignition timing control device according to the eighth embodiment of the present invention.

As shown in the flowchart of FIG. 17, it is judged at step (S) 800 whether or not the reference ignition signal (A) has been inputted (i.e. the same judgment as in step 180 of the adjusted ignition timing determination process is made). When the judgment result is positive, the process goes to step 810. When the judgment result is negative, the process stands by in this step.

At step 810, it is judged whether or not the rotation speed RPN(S) of the internal combustion engine as stored at step 240 of the adjusted ignition timing determination process falls within an adjustment permission range. When the engine rotation speed RPN(S) falls within the adjustment permission range, the positive judgment is made. In this case, the process goes to step 820. When the engine rotation speed RPN(S) does not fall within the adjustment permission range, the negative judgment is made. The process goes to step 840 in this case. In the eighth embodiment, the adjustment permission range of the engine rotation speed RPN(S) is set to the same range as in the first embodiment.

At step 820, it is judged whether the rotation speed deviation ΔRPN(S) of the internal combustion engine as determined at step 280 falls within an adjustment permission range. When the engine rotation speed deviation ΔRPN(S) falls within the adjustment permission range, the positive judgment is made. In this case, the process goes to step 830. When the engine rotation speed deviation ΔRPN(S) does not fall within the adjustment permission range, the negative judgment is made. The process goes to step 400 in this case. In the eighth embodiment, the adjustment permission range of the engine rotation speed deviation ΔRPN(S) is set to the same range as in the first embodiment.

At step 830, the switching command signal Sa for output to the selector switch 352 is switched to the high level.

At step 840, the switching command signal Sa for output to the selector switch 352 is switched to the low level.

After the completion of step 830 or step 840, the process goes back to step 800. The processing of steps 800 to 840 is repeatedly performed in the signal switching process. This processing is performed until the stop of the ignition timing adjustment unit 43.

As described above, the signal switching process allows selection of the first path 348 as the signal path by switching the command signal Sa to high level in a condition that the operation state of the internal combustion engine 1 is suitable for adjustment of the ignition timing; and the signal switching process allows selection of the second path 350 as the signal path by switching the command signal Sa to the low level in a condition that the operation state of the internal combustion engine 1 is not suitable for adjustment of the ignition timing.

Thus, the ignition timing control device 331 outputs, to the igniter 333, the adjusted ignition signal as adjusted (corrected) by the ignition timing adjustment unit 343 in a condition that the operation state of the internal combustion engine 1 is suitable for adjustment of the ignition timing. In a condition that the operation state of the internal combustion engine 1 is not suitable for adjustment of the ignition timing, the ignition timing control device 331 outputs the reference ignition signal (A) as it is obtained from the internal combustion engine control unit 337 to the igniter 333.

In this way, the ignition timing control device 331 switches whether or not to adjust (correct) the ignition timing depending on whether or not the operation state of the internal combustion engine 1 is not suitable for adjustment of the ignition timing

[8-3. Effects of Eighth Embodiment]

The effects of the eighth embodiment will be explained below.

In the eighth embodiment, the ignition timing control device is able to adjust (correct) the ignition timing as in the case of the first embodiment.

It is therefore possible in the eighth embodiment, at the time of properly adjusting (correcting) the ignition timing by advance control or retard control with reference to the knocking signal, to obtain remarkable effects such as elimination of the need to reconsider the design of the internal combustion engine control unit 281 for such ignition timing control and significant reduction of the effort (work load) and cost for such design reconsideration as in the case of the first embodiment.

It is also possible in the eighth embodiment, as in the case of the first embodiment, to avoid adverse influence on the operation state of the internal combustion engine by outputting the reference ignition signal (A) without adjustment of the ignition timing in a condition that the operation state of the internal combustion engine 1 is not suitable for adjustment of the ignition timing as in the case of the first embodiment.

It is further possible in the eighth embodiment, as in the case of the first embodiment, to suppress the occurrence of engine knocking by adjusting (correcting) the ignition signal with reference to the knocking signal and outputting the adjusted ignition signal in a condition that the operation state of the internal combustion engine 1 is suitable for adjustment of the ignition timing.

[8-4. Correspondence of Claims]

Herein, the correspondence of claims to the eighth embodiment will be discussed below.

The ignition timing adjustment unit 343 and the selector switch 352, which execute the signal switching process, correspond to an example of the claimed signal switching portion.

9. Other Embodiments

The present invention is not limited to the above embodiments. Various changes and modifications of the above embodiments are possible within the scope of the present invention.

Although the adjustment permission range of the engine rotation speed RPN(S) is set to the rotation speed range of 2000 rpm or higher in the above embodiments, the adjustment permission range of the engine rotation speed RPN(S) is not limited to this rotation speed range in the present invention. Alternatively, the adjustment permission range of the engine rotation speed RPN(S) may be set to a range of 1500 rpm or higher. The rotation speed boundary is not limited to 2000 rpm and can be set to an arbitrary value. The adjustment permission range of the engine rotation speed RPN(S) may alternatively be set to a range defined by upper and lower limit values, e.g., a rotation speed range of 2000 to 6000 rpm.

It is feasible to modify the adjusted ignition timing determination process of FIG. 15 such that step 700 (knocking detection process) is executed after the positive judgement is made in step 710, rather than before step 710.

In this modified example, the knocking detection result is utilized in the subsequent processing (step 740) when the positive judgment is made in step 710. When the negative judgment is made in step 710, the knocking detection result is not utilized in the subsequent processing. Namely, the knocking detection process is executed only in the case where the knocking detection result is required for the subsequent processing (i.e. in the case where the positive judgment is made in step 710). It is thus possible to reduce the processing load of the ignition timing adjustment unit by executing the knocking detection process only in the case where the knocking detection result is required.

In the above embodiments, the time interval between the successive reference signals (A) (that is, the time interval of receipt of the reference ignition signal) is determined as the time interval between falling edges of the successive reference ignition signals (A). The method of determining the time interval of receipt of the reference ignition signal is not limited to such a method. For example, it is alternatively feasible to determine the time interval of receipt of the reference ignition signal using the time interval between leading edges of the successive reference ignition signals (A).

In this case, the time interval of receipt of the reference ignition signal is determined by calculating the time interval between the falling edges of the reference ignition signals (A) with consideration of the time interval between the leading edges of the reference ignition signals (A) and the high-level continuation time (i.e. time from the leading edge to the falling edge) of the reference ignition signal (A). The high-level continuation time of the reference ignition signals (A) may be stored in advance in the device unit and retrieved and used as needed for determination of the time interval of the reference ignition signal.

The knocking detection unit is not limited to the non-resonant type knocking sensor. A resonant type knocking sensor can alternatively be used. There is no particular limitation on the kind of the knocking detection unit as long as it is capable of detecting engine knocking.

There is also no particular limitation on the method for detection of engine knocking although engine knocking is detected from the peak of the knocking signal in the above embodiments. It is alternatively feasible to detect engine knocking by any other known method e.g. by means of a FFT value or integration value of the knocking signal The present invention is also applicable to a two-cycle engine.

In the present invention, there can be used any equipment that performs various control processing by a microcomputer as the external electronic control unit. The internal combustion engine control unit, which is provided separately from the ignition timing control device (through a detachable lead line etc.) for operation control of the internal combustion engine, is one example of the external electronic control unit.

In the case where the ignition timing adjustment unit and the selector switch are provided separately as in the eighth embodiment, the selector switch may be configured to switch the signal path to the second path upon input of an illegal signal exceeding a signal level outputtable by the ignition timing adjustment unit. In this configuration, it is possible to output the ignition signal through the second path by bypassing the ignition timing adjustment unit when there occurs a failure in the ignition timing adjustment unit so that the ignition timing adjustment unit cannot output a proper switching command signal. It is thus advantageously possible to, even when there occurs a failure in the ignition timing adjustment unit, output the ignition signal and continue the operation of the internal combustion engine.

DESCRIPTION OF REFERENCE NUMERALS

1: Internal combustion engine
31, 121, 141, 161, 191, 233, 269, 287, 331: Ignition timing control device
37, 281, 337: Internal combustion engine control unit
38, 290, 338: Ignition timing control system
41, 123, 143, 163, 193, 237, 283, 341: Knocking detection unit
43, 125, 145, 165, 195, 235, 271, 285, 343: Ignition timing adjustment unit
229: Electronic control unit
251: Ignition drive circuit

The invention claimed is:

1. An ignition timing control device for an internal combustion engine, comprising:
   a knocking detection unit comprising a piezoelectric element and being configured to detect a knocking state of the internal combustion engine and output a knocking signal indicating the knocking state of the internal combustion engine; and
   an ignition timing adjustment unit comprising a microcomputer, the ignition timing adjustment unit being configured to receive the knocking signal outputted from the knocking detection and to receive an ignition timing signal outputted from an external electronic control unit,
   wherein the microcomputer is programmed to:
      adjust an ignition timing of the internal combustion engine based on the knocking signal received from the knocking detection unit and the ignition timing signal received from the external electronic control unit, the ignition timing signal relating to the ignition timing of the internal combustion engine,
      determine rotation speed-related information based on the ignition timing signal, the rotation speed-related information including at least one of a rotation speed of the internal combustion engine and a rotation speed variation amount of the internal combustion engine;
      judge whether the rotation speed-related information falls within a predetermined adjustment permission range;
      when the rotation speed-related information falls within the adjustment permission range, output an adjusted ignition signal relating to the ignition timing adjusted by the ignition timing adjustment unit; and
      when the rotation speed-related information falls outside the adjustment permission range, output the ignition timing signal without adjustment of the ignition timing by the ignition timing adjustment unit.

2. The ignition timing control device according to claim 1,
   wherein the microcomputer is further programmed to:
      determine at least the rotation speed of the internal combustion engine;
      when the rotation speed is determined to fall outside an adjustment permission range, judge that the rotation speed-related information falls outside the adjustment permission range and output the ignition timing signal without amendment of the ignition timing by the ignition timing adjustment unit; and
      when the rotation speed-related information including the rotation speed is determined to fall within the adjustment permission range, judge that the rotation speed-related information falls within the adjustment permission range and output the adjusted ignition signal relating to the ignition timing adjusted by the ignition timing adjustment unit.

3. The ignition timing control device according to claim 1,
   wherein the microcomputer is further programmed to:
      determine at least the rotation speed variation amount of the internal combustion engine;
      when the rotation speed variation amount is determined to fall outside an adjustment permission range, judge that the rotation speed-related information falls outside the adjustment permission range and output the ignition signal without amendment of the ignition timing by the ignition timing adjustment unit; and when the rotation speed-related information including the rotation speed variation amount is determined to fall within the adjustment permission range, judge that the rotation speed-related information falls within the adjustment permission range and output the adjusted ignition signal relating to the ignition timing adjusted by the ignition timing adjustment unit.

4. The ignition timing control device according to claim 1, wherein the microcomputer is further programmed to determine the rotation speed of the internal combustion engine based on a time interval of receipt of the ignition timing signal.

5. The ignition timing control device according to claim 1, wherein the ignition timing signal is a reference ignition signal indicating a reference ignition timing.

6. An ignition timing control system for an internal combustion engine, comprising:

an engine control unit comprising a microcomputer, wherein the microcomputer of the engine control is programmed to output an ignition signal relating to an ignition timing of the internal combustion engine; and the ignition timing control device according to claim 1 wherein the microcomputer of the engine control unit and the microcomputer of the ignition timing control device are different microcomputers.

* * * * *